(12) United States Patent
Lucas

(10) Patent No.: US 12,361,648 B2
(45) Date of Patent: Jul. 15, 2025

(54) HAND-TRACKING STABILIZATION

(71) Applicant: Snap Inc., Santa Monica, CA (US)

(72) Inventor: Benjamin Lucas, Santa Monica, CA (US)

(73) Assignee: SNAP INC., Santa Monica, CA (US)

( * ) Notice: Subject to any disclaimer, the term of this patent is extended or adjusted under 35 U.S.C. 154(b) by 197 days.

(21) Appl. No.: 17/822,634

(22) Filed: Aug. 26, 2022

(65) Prior Publication Data

US 2024/0070992 A1    Feb. 29, 2024

(51) Int. Cl.
| G06T 19/00 | (2011.01) |
| G06F 3/01 | (2006.01) |
| G06V 20/64 | (2022.01) |

(52) U.S. Cl.
CPC ............ G06T 19/006 (2013.01); G06F 3/011 (2013.01); G06V 20/653 (2022.01)

(58) Field of Classification Search
None
See application file for complete search history.

(56) References Cited

U.S. PATENT DOCUMENTS

| 7,971,156 | B2 | 6/2011 | Albertson et al. |
| 7,996,793 | B2 | 8/2011 | Latta et al. |
| 8,487,938 | B2 | 7/2013 | Latta et al. |
| 8,856,691 | B2 | 10/2014 | Geisner et al. |
| 9,225,897 | B1 | 12/2015 | Sehn et al. |
| 9,230,160 | B1 | 1/2016 | Kanter |
| 9,276,886 | B1 | 3/2016 | Samaranayake |
| 9,705,831 | B2 | 7/2017 | Spiegel |
| 9,742,713 | B2 | 8/2017 | Spiegel et al. |
| 10,102,423 | B2 | 10/2018 | Shaburov et al. |

(Continued)

FOREIGN PATENT DOCUMENTS

| CN | 103049761 B | 8/2016 |
| CN | 109521868 | 3/2019 |

(Continued)

OTHER PUBLICATIONS

"International Application Serial No. PCT/US2023/071923, International Search Report mailed Dec. 8, 2023", 5 pgs.

(Continued)

*Primary Examiner* — James A Thompson
(74) *Attorney, Agent, or Firm* — SCHWEGMAN LUNDBERG & WOESSNER, P.A.

(57) ABSTRACT

An Augmented Reality (AR) system provides stabilization of hand-tracking input data. The AR system provides for display a user interface of an AR application. The AR system captures, using one or more cameras of the AR system, video frame tracking data of a gesture being made by a user while the user interacts with the AR user interface. The AR system generates skeletal 3D model data of a hand of the user based on the video frame tracking data that includes one or more skeletal 3D model features corresponding to recognized visual landmarks of portions of the hand of the user. The AR system generates targeting data based on the skeletal 3D model data where the targeting data identifies a virtual 3D object of the AR user interface. The AR system filters the targeting data using a targeting filter component and provides the filtered targeting data to the AR application.

20 Claims, 12 Drawing Sheets

(56) References Cited

U.S. PATENT DOCUMENTS

| | | | |
|---|---|---|---|
| 10,284,508 B1 | 5/2019 | Allen et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Majid et al. | |
| 11,062,498 B1 | 7/2021 | Voss et al. | |
| 11,087,728 B1 | 8/2021 | Canberk et al. | |
| 11,092,998 B1 | 8/2021 | Canberk et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 2009/0012788 A1 | 1/2009 | Gilbert et al. | |
| 2011/0301934 A1* | 12/2011 | Tardif | G06F 40/45 382/103 |
| 2014/0171036 A1 | 6/2014 | Simmons | |
| 2015/0120293 A1 | 4/2015 | Wohlert et al. | |
| 2015/0370320 A1 | 12/2015 | Connor | |
| 2017/0123487 A1* | 5/2017 | Hazra | G06F 3/0482 |
| 2017/0277684 A1 | 9/2017 | Dharmarajan Mary | |
| 2017/0277685 A1 | 9/2017 | Takumi | |
| 2017/0351910 A1 | 12/2017 | Elwazer et al. | |
| 2018/0158370 A1 | 6/2018 | Pryor | |
| 2019/0146219 A1 | 5/2019 | Rodriguez, II | |
| 2021/0011612 A1 | 1/2021 | Dancie et al. | |
| 2021/0019935 A1* | 1/2021 | Neulander | G06T 19/20 |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1* | 12/2021 | Canberk | G02B 27/0172 |
| 2022/0188539 A1 | 6/2022 | Chan et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |

FOREIGN PATENT DOCUMENTS

| | | |
|---|---|---|
| EP | 3707693 A1 | 9/2020 |
| EP | 4172726 | 5/2023 |
| EP | 4172730 | 5/2023 |
| KR | 20140024421 | 2/2014 |
| KR | 20220158824 | 12/2022 |
| WO | WO-2016168591 A1 | 10/2016 |
| WO | 2018174970 | 9/2018 |
| WO | WO-2019094618 A1 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |
| WO | 2024044473 | 2/2024 |

OTHER PUBLICATIONS

"International Application Serial No. PCT/US2023/071923, Written Opinion mailed Dec. 8, 2023", 7 pgs.

Siyou, Pei, "Hand Interfaces: Using Hands to Imitate Objects in Ar Vr for Expressive Interactions", Image, Video and Signal Processing, ACM, 2 Penn Plaza, Suite 701, New York, NY 10121-0701 USA, (Apr. 29, 2022), 16 pgs.

Xiao, Tang, "GrabAR: Occlusion-aware Grabbing Virtual Objects in AR", arxiv.org, Cornell University Library, 201 Olin Library Cornell University Ithaca, NY 14853, (Dec. 23, 2019), 11 pgs.

* cited by examiner

HAND-TRACKING STABILIZATION

TECHNICAL FIELD

The present disclosure relates generally to user interfaces and more particularly to user interfaces used for augmented or virtual reality.

BACKGROUND

A head-wearable apparatus may be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus may additionally completely occlude a user's visual field and display a virtual environment through which a user may move or be moved. This is typically referred to as "virtual reality" or "VR."." In a hybrid form, a view of the surrounding environment is captured using cameras, and then that view is displayed along with augmentation to the user on displays the occlude the user's eyes. As used herein, the term AR refers to augmented reality, virtual reality and any of hybrids of these technologies unless the context indicates otherwise.

A user of the head-wearable apparatus may access and use a computer software application to perform various tasks or engage in an entertaining activity. To use the computer software application, the user interacts with a user interface provided by the head-wearable apparatus.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

Other technical features may be readily apparent to one skilled in the art from the following figures, descriptions, and claims.

DETAILED DESCRIPTION

An AR application provided by a head-wearable apparatus provides interactions to a user where a targeting component is used to select an interaction with a target virtual 3D object of an AR user interface of the AR application and an actuation component is used to initiate an interaction with the virtual 3D object. For example, some hand interaction frameworks uses a combination of a hand pose to select the target virtual 3D object, and a 'pinch' gesture to actuate interactions with the target virtual 3D object. Because the pinch gesture may change the hand pose, the pinch gesture may disturb selection of the intended target virtual 3D object of an interaction.

In some examples, computer vision gesture and hand pose estimation is improved by training an ML hand-tracking model to make some recognized hand poses invariant to hand movement during a pinch gesture. In some examples, this is done by annotating training hand-video frame tracking data to ignore some features of a user's hand and training an ML hand-tracking model using the specially annotated training hand-video frame tracking data. In some examples, the hand-video frame tracking data is selected to include video frame tracking data where knuckle features do not move during pinch gestures.

In some examples, a hand-tracking pipeline temporally smooths or filters one or more skeletal 3D model features of a skeletal 3D model corresponding to a hand of a user. In some examples, a degree of temporal smoothing or filtering is applied differentially to the skeletal 3D model features such that a greater degree of smoothing or filtering is applied to specified skeletal 3D model features than a degree of smoothing or filtering applied to a remainder of the skeletal 3D model features.

In some examples, temporal smoothing or filtering applied to skeletal 3D model features is dynamically adjusted such that a degree of smoothing applied to a target virtual 3D object is adjusted in proportion to a probability an onset of a specified gesture or hand pose.

In some examples, a hand-tracking pipeline employs composite hand features to determine a gesture or hand pose. Multiple hand, wrist, and shoulder features are composited into a feature that minimizes changes in targeting during a gesture.

In some examples, a previous state of a user's hand while the user's hand hovers over or targets a virtual 3D object for interaction is considered when changing from one targeted virtual 3D object to another virtual 3D object. In an example, a distance based selection algorithm where a closest virtual 3D object to a center of the user's hand is selected, then a debounce or term of a hysteresis function provides a bonus to a virtual 3D object that is currently selected, such as by a reduction in a calculated distance.

Figure 1A:
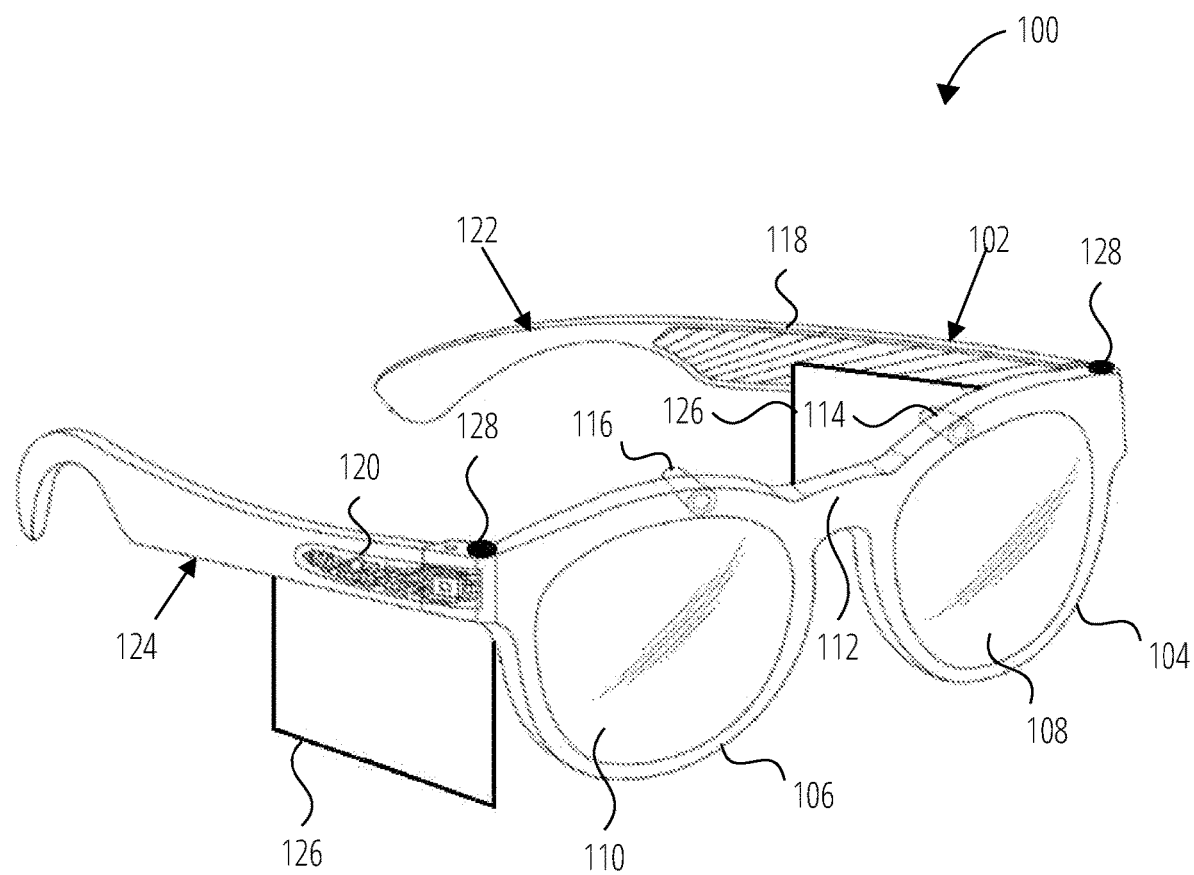
FIG. 1A is a perspective view of a head-worn device, in accordance with some examples.

FIG. 1A is a perspective view of a head-wearable apparatus 100 in accordance with some examples. The head-wearable apparatus 100 may be a client device of an AR system, such a computing system 402 of FIG. 4. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of the computer 120 may be implemented as illustrated by the machine 200 discussed below.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras. In some examples, the head-wearable apparatus 100 includes one or more visible light cameras, an infrared emitter, and an infrared camera. In one or more examples, the head-wearable apparatus 100 includes any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame tracking data for use by the head-wearable apparatus 100 to extract 3D information from a real-world scene.

The head-wearable apparatus 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
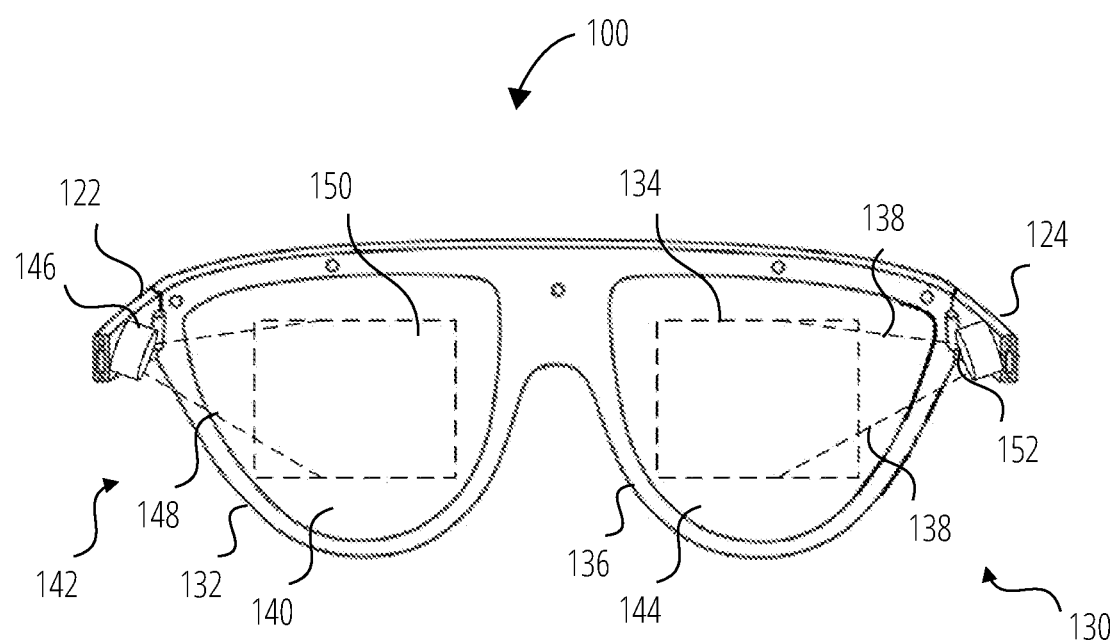
FIG. 1B illustrates a further view of the head-worn device of FIG. 1A, in accordance with some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world scene seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world scene seen by the user. The combination of a GPU, the right forward optical assembly 130, the left optical element 140, and the right optical element 144 provide an optical engine of the head-wearable apparatus 100. The head-wearable apparatus 100 uses the optical engine to generate an overlay of the real-world scene view of the user including display of a user interface to the user of the head-wearable apparatus 100.

It will be appreciated however that other display technologies or configurations may be utilized within an optical engine to display an image to a user in the user's field of view. For example, instead of a hand-tracking pipeline 348 and a waveguide, an LCD, LED or other display panel or surface may be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 414 illustrated in FIG. 5), and/or hand movements, locations, and positions recognized by the head-wearable apparatus 100.

In some examples, the head-wearable apparatus 100 comprises an AR system. In some examples, the head-wearable apparatus 100 is a component of an AR system including additional computational components. In some examples, the head-wearable apparatus 100 is a component in an AR system comprising additional user input systems or devices.

Machine Architecture

Figure 2:
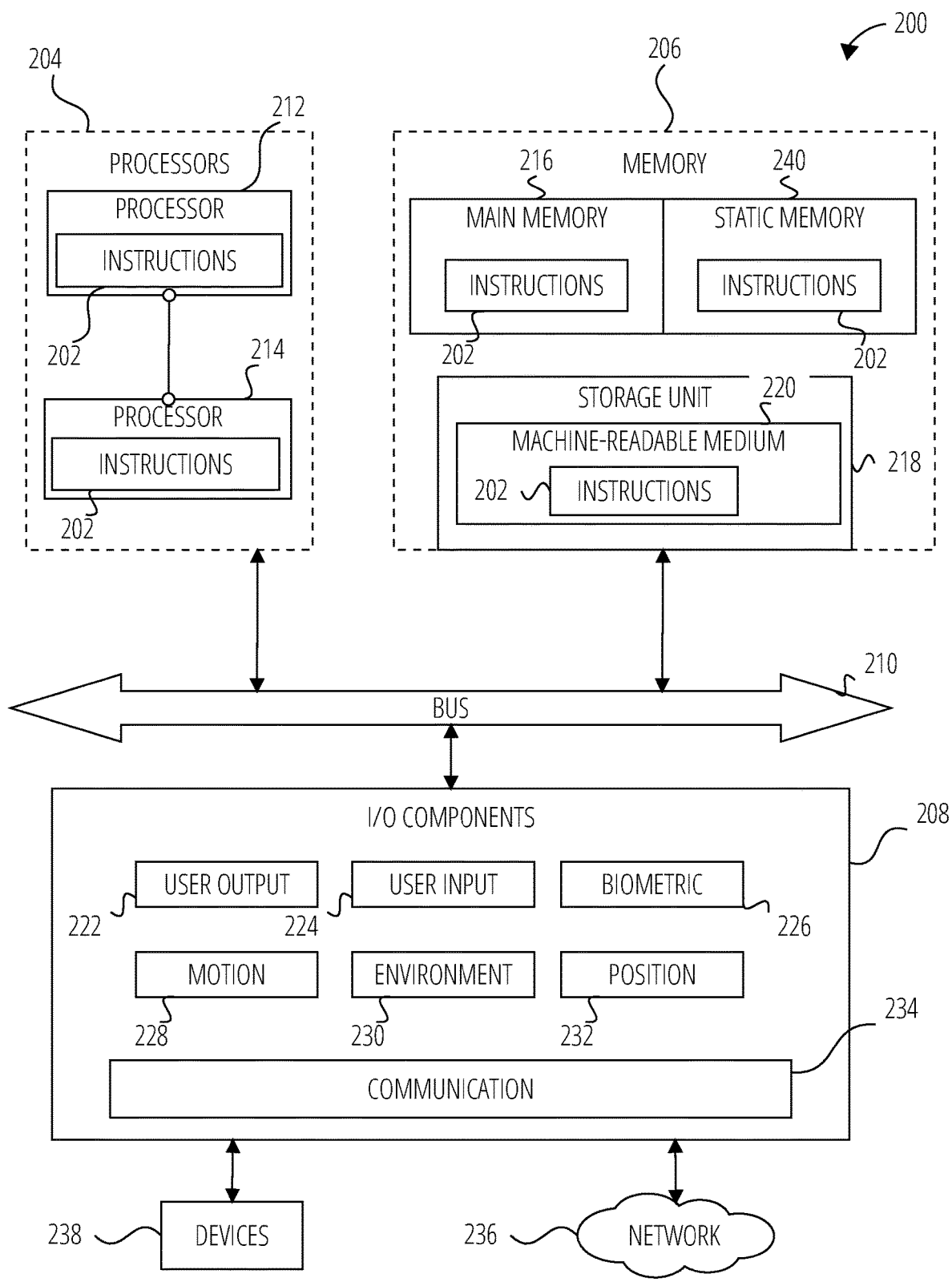
FIG. 2 is a diagrammatic representation of a machine in the form of a computer system within which a set of instructions may be executed to cause the machine to perform any one or more of the methodologies discussed herein, according to some examples.

FIG. 2 is a diagrammatic representation of the machine 200 within which instructions 202 (e.g., software, a program, an application, an applet, an app, or other executable code) for causing the machine 200 to perform any one or more of the methodologies discussed herein may be executed. For example, the instructions 202 may cause the machine 200 to execute any one or more of the methods described herein. The instructions 202 transform the general, non-programmed machine 200 into a particular machine 200 programmed to carry out the described and illustrated functions in the manner described. The machine 200 may operate as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 202, sequentially or otherwise, that specify actions to be taken by the machine 200. Further, while a single machine 200 is illustrated, the term "machine" shall also be taken to include a collection of machines that individually or jointly execute the instructions 202 to perform any one or more of the methodologies discussed herein. The machine 200, for example, may comprise the computing system 402 or any one of multiple server devices forming part of the interaction server system 410. In some examples, the machine 200 may also comprise both client and server systems, with certain operations of a particular method or algorithm being performed on the server-side and with certain operations of the particular method or algorithm being performed on the client-side.

The machine 200 may include processors 204, memory 206, and input/output I/O components 208, which may be configured to communicate with each other via a bus 210. In an example, the processors 204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 212 and a processor 214 that execute the instructions 202. The term "processor" is intended to include multi-core processors that may comprise two or more independent processors (sometimes referred to as "cores") that may execute instructions contemporaneously. Although FIG. 2 shows multiple processors 204, the machine 200 may include a single processor with a single-core, a single processor with multiple cores (e.g., a multi-core processor), multiple processors with a single core, multiple processors with multiples cores, or any combination thereof.

The memory 206 includes a main memory 216, a static memory 240, and a storage unit 218, both accessible to the processors 204 via the bus 210. The main memory 206, the static memory 240, and storage unit 218 store the instructions 202 embodying any one or more of the methodologies or functions described herein. The instructions 202 may also reside, completely or partially, within the main memory 216, within the static memory 240, within machine-readable medium 220 within the storage unit 218, within at least one of the processors 204 (e.g., within the processor's cache memory), or any suitable combination thereof, during execution thereof by the machine 200.

The I/O components 208 may include a wide variety of components to receive input, provide output, produce output, transmit information, exchange information, capture measurements, and so on. The specific I/O components 208 that are included in a particular machine will depend on the type of machine. For example, portable machines such as mobile phones may include a touch input device or other such input mechanisms, while a headless server machine will likely not include such a touch input device. It will be appreciated that the I/O components 208 may include many other components that are not shown in FIG. 2. In various examples, the I/O components 208 may include user output components 222 and user input components 224. The user output components 222 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 224 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 208 may include biometric components 226, motion components 228, environmental components 230, or position components 232, among a wide array of other components. For example, the biometric components 226 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 228 include acceleration sensor components (e.g., accelerometer), gravitation sensor components, rotation sensor components (e.g., gyroscope).

The environmental components 230 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that may provide indications, measurements, or signals corresponding to a surrounding physical environment.

With respect to cameras, the computing system 402 may have a camera system comprising, for example, front cameras on a front surface of the computing system 402 and rear cameras on a rear surface of the computing system 402. The front cameras may, for example, be used to capture still images and video of a user of the computing system 402 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the computing system 402 may also include a 360° camera for capturing 360° photographs and videos.

Further, the camera system of the computing system 402 may include dual rear cameras (e.g., a primary camera as well as a depth-sensing camera), or even triple, quad or penta rear camera configurations on the front and rear sides of the computing system 402. These multiple cameras systems may include a wide camera, an ultra-wide camera, a telephoto camera, a macro camera, and a depth sensor, for example.

The position components 232 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 208 further include communication components 234 operable to couple the machine 200 to a network 236 or devices 238 via respective coupling or connections. For example, the communication components 234 may include a network interface component or another suitable device to interface with the network 236. In further examples, the communication components 234 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 238 may be another machine or any of a wide variety of peripheral devices (e.g., a peripheral device coupled via a USB).

Moreover, the communication components 234 may detect identifiers or include components operable to detect identifiers. For example, the communication components 234 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 234, such as location via Internet Protocol (IP) geolocation, location via Wi-Fi® signal triangulation, location via detecting an NFC beacon signal that may indicate a particular location, and so forth.

The various memories (e.g., main memory 216, static memory 240, and memory of the processors 204) and storage unit 218 may store one or more sets of instructions and data structures (e.g., software) embodying or used by any one or more of the methodologies or functions described herein. These instructions (e.g., the instructions 202), when executed by processors 204, cause various operations to implement the disclosed examples.

The instructions 202 may be transmitted or received over the network 236, using a transmission medium, via a network interface device (e.g., a network interface component included in the communication components 234) and using any one of several well-known transfer protocols (e.g., hypertext transfer protocol (HTTP)). Similarly, the instructions 202 may be transmitted or received using a transmission medium via a coupling (e.g., a peer-to-peer coupling) to the devices 238.

Figure 3A:
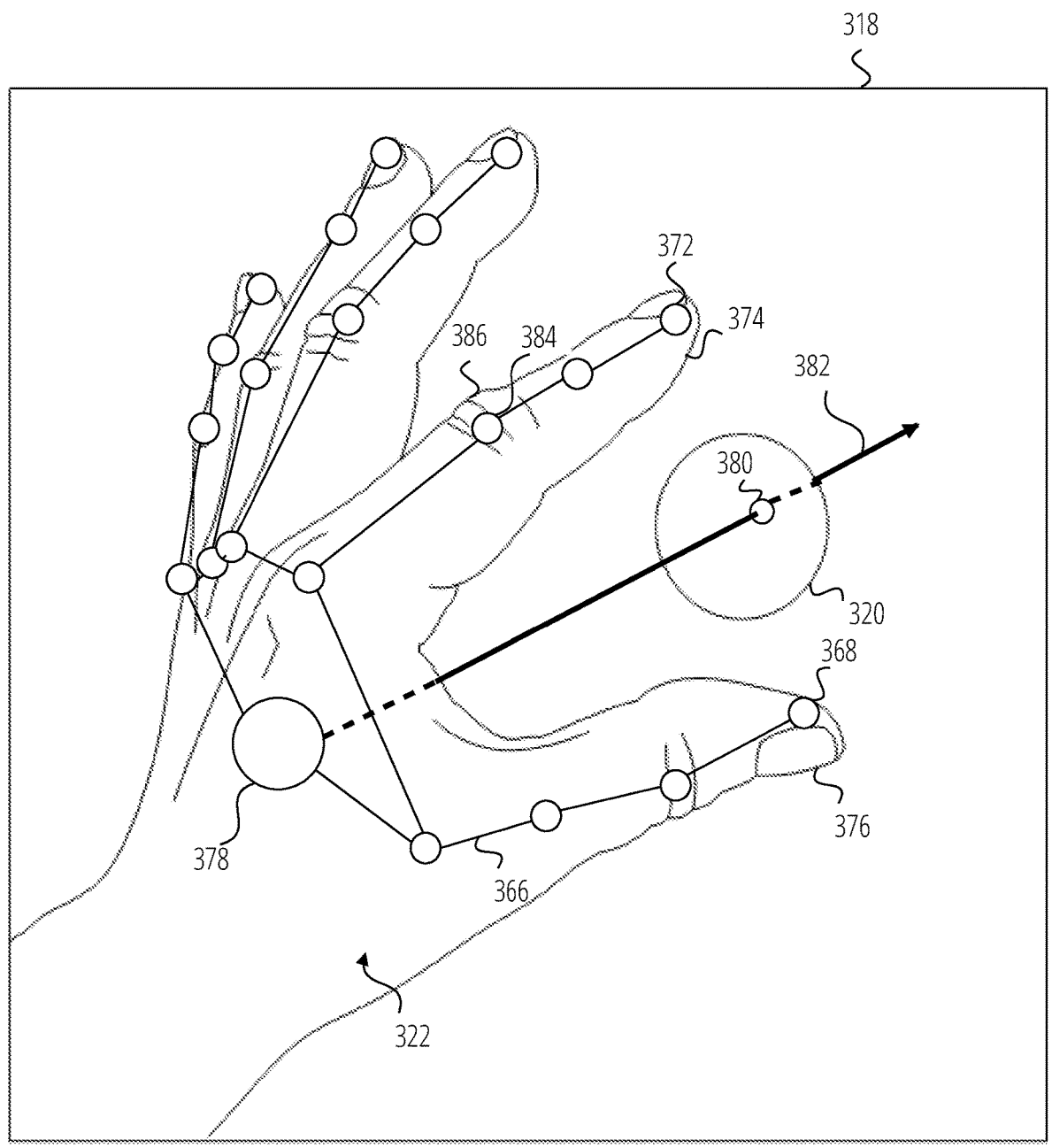
FIG. 3A and FIG. 3B are illustrations of an AR user interface according to some examples.
Figure 3B:
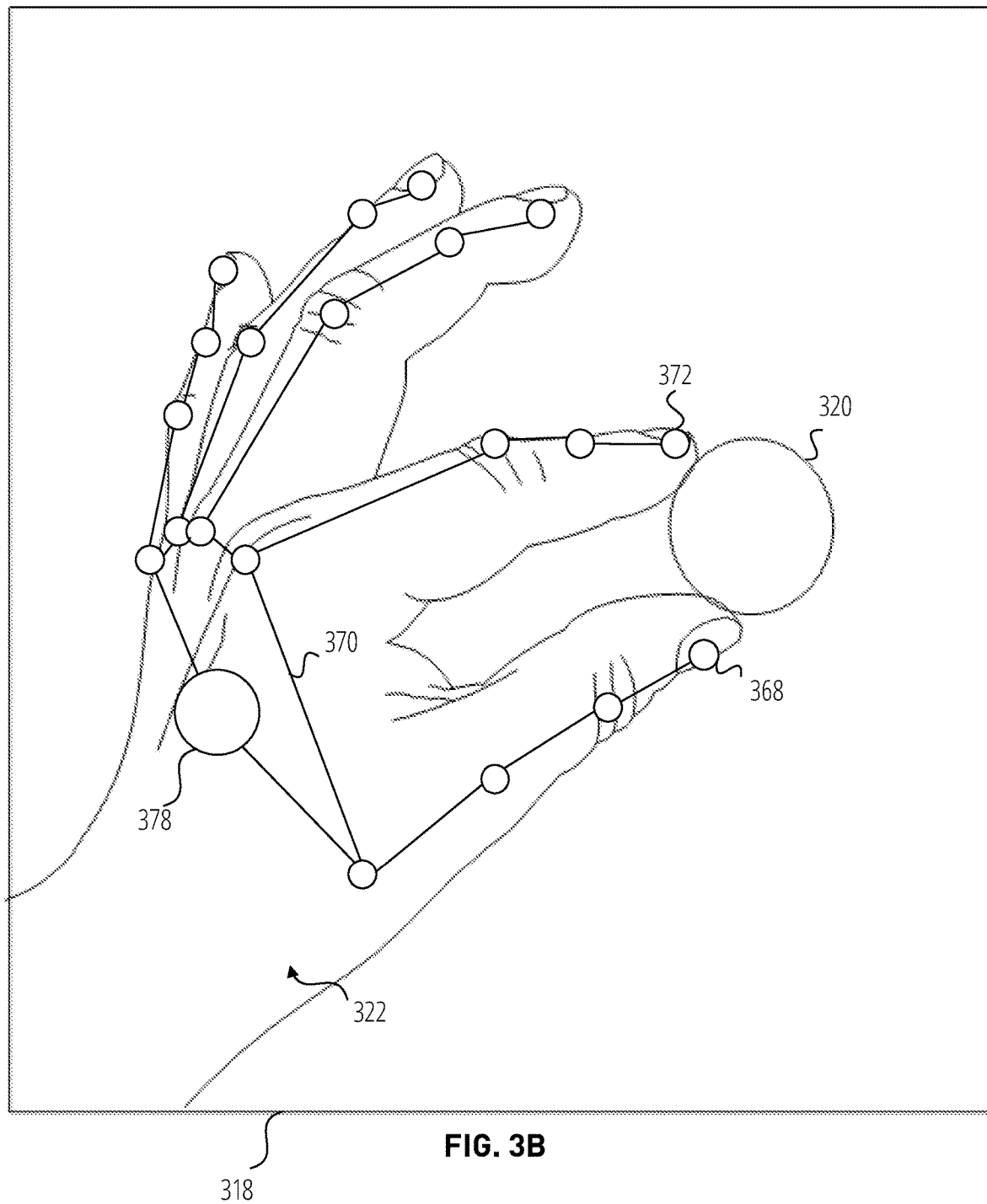
Figure 3C:
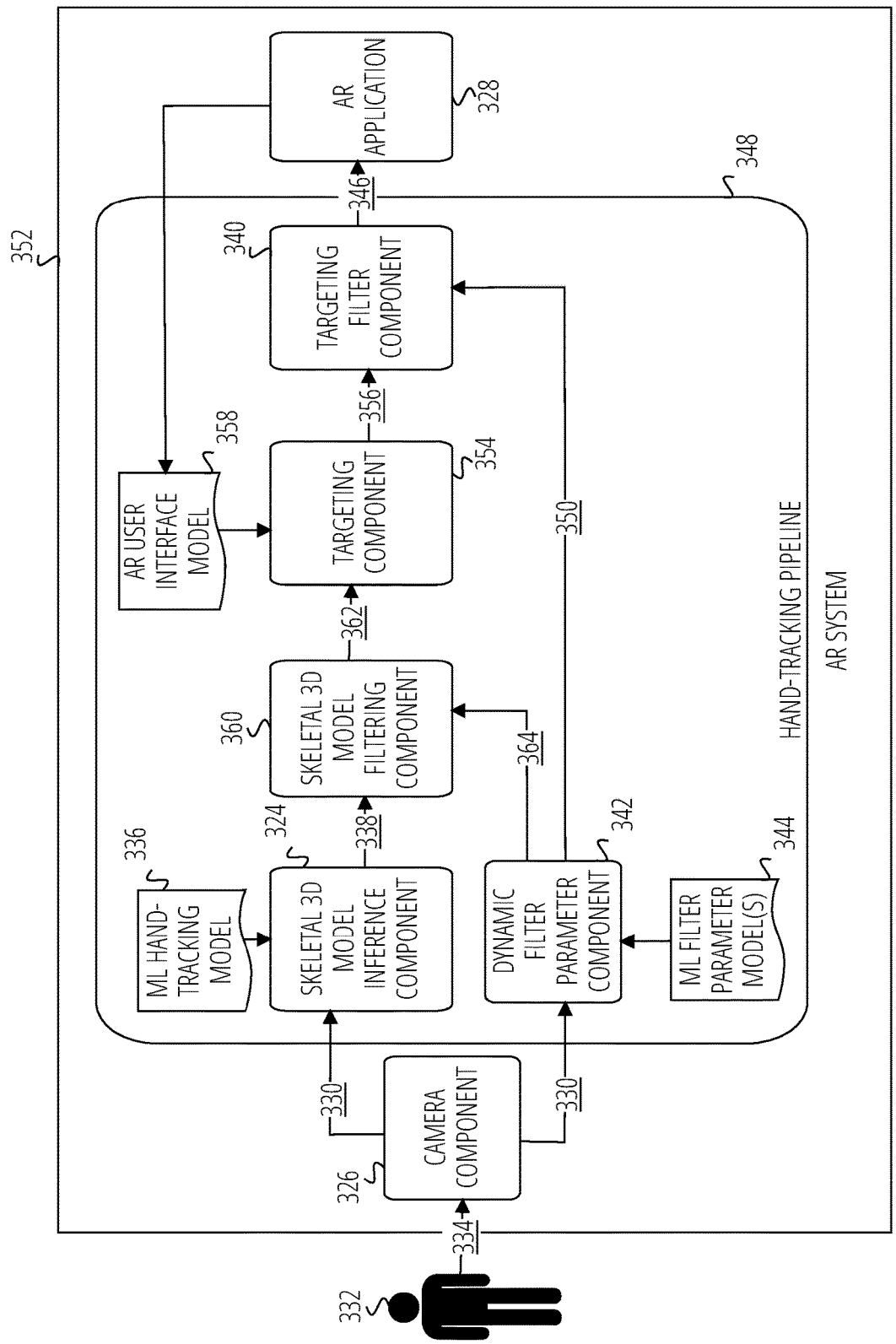
FIG. 3C is collaboration diagram of components of an AR system providing an AR user interface according to some examples.
Figure 3D:
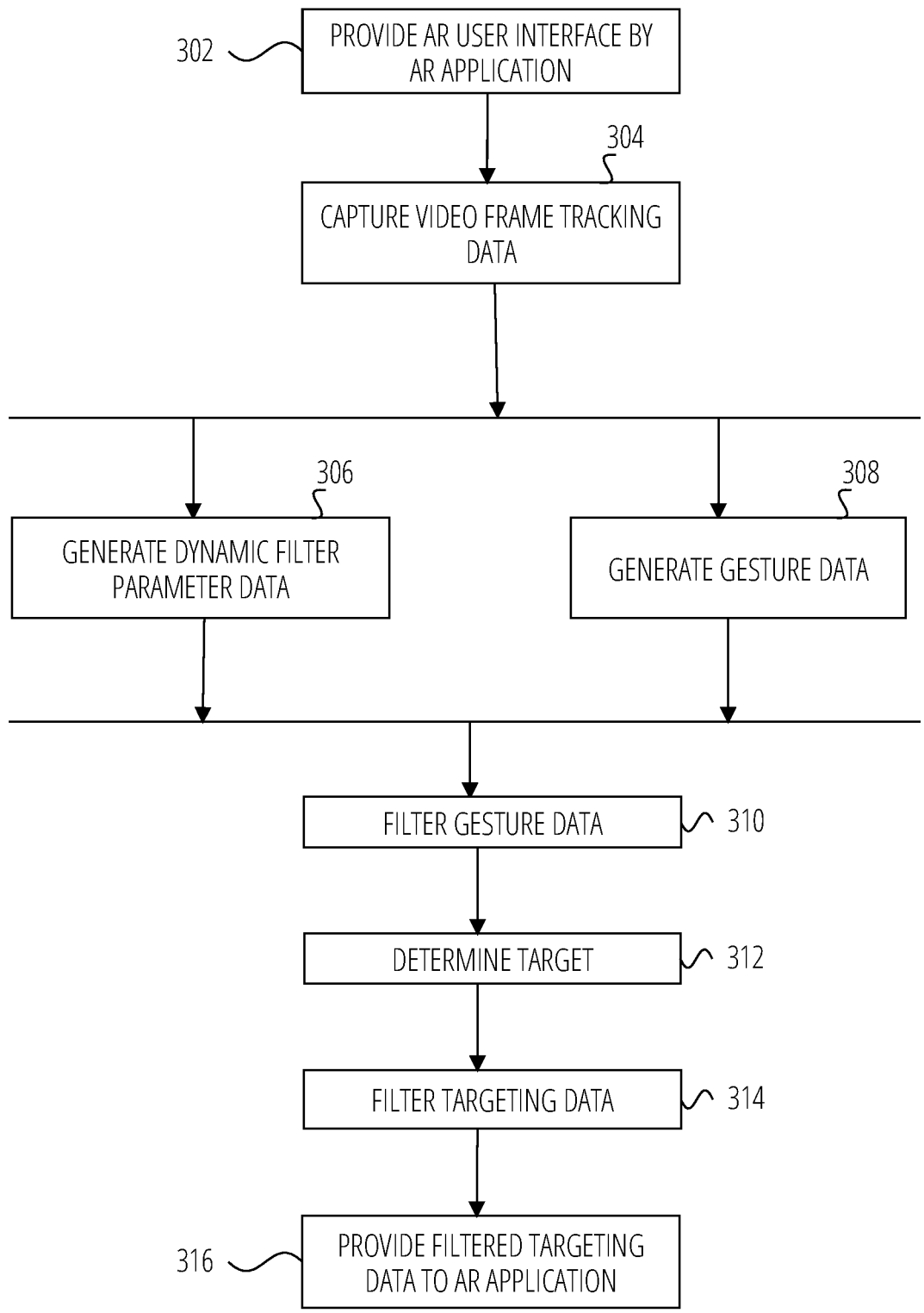
FIG. 3D is an activity diagram of a gesture and hand pose detection method used by the AR system to provide user inputs to the AR user interface according to some embodiments.

FIG. 3A and FIG. 3B are illustrations of an AR user interface, FIG. 3C is collaboration diagram of components of an AR system providing the AR user interface, and FIG. 3D is an activity diagram of a gesture and hand pose detection method used by the AR system to provide user inputs to the AR user interface, in accordance with some examples. As shown in FIG. 3C, an AR system 352 includes a hand-tracking pipeline 348 that captures video frame tracking data 330 of gestures and hand poses 334 being made by a user 332 as the user 332 interacts with an AR application 328.

In operation 302 of FIG. 3D, an AR application 328, such as shown in FIG. 3C, of the AR system 352 provides an AR user interface 318 to a user 332. The AR user interface 318 includes one or more virtual 3D objects 320, as shown in FIG. 3A and FIG. 3B that the user 332 interacts with to provide input into the AR user interface 318.

In operation 304, the AR system 352 captures video frame tracking data 330 of portions of a forearm, wrist, and hand 322 of the user 332 from a perspective of the user 332. To capture the video frame tracking data 330, the AR system 352 uses one or more cameras, such as cameras 114 and 116 of FIG. 1A, of a camera component 326 of the AR system 352. The camera component 326 generates video frame tracking data 330 based on the captured video data of the gestures and hand poses 334 being made by the user 332. The video frame tracking data 330 includes video data of detectable portions of a forearm, wrist, and hand 322 of the user 332 as the user 332 makes the gestures and hand poses 334 while interacting with the AR user interface 318. The camera component 326 communicates the video frame tracking data 330 to a skeletal 3D model inference component 324 and a dynamic filter parameter component 342 as shown in FIG. 3C.

In operation 308, the skeletal 3D model inference component 324 receives the video frame tracking data 330 from the camera component 326 and generates skeletal 3D model data 338 based on the video frame tracking data 330. For example, the skeletal 3D model inference component 324 recognizes landmark features on portions of the forearm, wrist, and hand 322 of the user 332 captured in the video frame tracking data 330. The skeletal 3D model inference component 324 generates data of a sequence of skeletal 3D models, such as skeletal 3D model 366 and skeletal 3D model 370, in a 3D coordinate system based on the landmark features. The skeletal 3D models comprise skeletal 3D model features, such as skeletal 3D model feature 368, skeletal 3D model feature 368, and skeletal 3D model feature 372 that correspond to recognized visual landmarks of portions of the forearm, wrist, and hand 322 of the user 332. In some examples, the skeletal 3D model data 338 includes landmark data such as landmark identification, a physical location of the landmark, segments between joints of the user's fingers, and categorization information of one or more landmarks associated with the forearm, wrist, and hand 322. For example, the skeletal 3D model inference component 324 generates the skeletal 3D model data 338 based on the video frame tracking data 330 using artificial intelligence methodologies and an ML hand-tracking model 336 previously generated using machine learning methodologies. In some examples, an ML hand-tracking model 336 comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies used to generate the ML hand-tracking model 336 may include, but are not limited to, supervised learning, unsupervised learning, semi-supervised learning, reinforcement learning, dimensionality reduction, self-learning, feature learning, sparse dictionary learning, and anomaly detection.

In some examples, the ML hand-tracking model 336 is trained to recognize combinations of wrist and knuckle positions indicating gestures and hand poses. In some examples, the ML hand-tracking model 336 is trained to recognize the gestures and hand poses independently of video frame tracking data emphasizing data of finger-tips when the gestures and hand poses are made. In some examples, the ML hand-tracking model 336 is trained to recognize shoulder positions of the user 332 while the user 332 is making gestures and hand poses. In some examples, training datasets used to train the ML hand-tracking model 336 are annotated such that knuckle features do not move during pinch gestures, thus increasing a measure of invariance of some hand features during a pinch gesture being made by the user 332.

In operation 306, the camera component 326 communicates the video frame tracking data 330 to a dynamic filter parameter component 342. The dynamic filter parameter component 342 receives the video frame tracking data 330 and generates skeletal 3D model filter parameter data 364 of a skeletal 3D model filtering component 360 based on the video frame tracking data 330. In some examples, the skeletal 3D model filtering component 360 smooths or filters skeletal 3D model data 338 generated by the skeletal 3D model inference component 324 using a temporal filter in order to eliminate jitter in the skeletal 3D model 366 of a gesture or hand pose being made by the user 332 as more fully described below. The skeletal 3D model filter parameter data 364 includes, but is not limited to, a degree of filtering that the skeletal 3D model filtering component 360 applies to the skeletal 3D model data 338.

The dynamic filter parameter component 342 also generates targeting filter parameter data 350 of a targeting filter component 340 based on the video frame tracking data 330. In some examples, the targeting filter component 340 smooths or filters targeting data 356 generated by the targeting filter component 340 using a temporal filter in order to eliminate jitter in a determined target virtual 3D object or a target location of a gesture or hand pose being made by the user 332 as more fully described below. The targeting filter parameter data 350 includes, but is not limited to, a degree of filtering that the targeting filter component 340 will apply to the targeting data 356.

In some examples, the dynamic filter parameter component 342 generates the targeting filter parameter data 350 and skeletal 3D model filter parameter data 364 based on the video frame tracking data 330 using artificial intelligence methodologies and one or more ML filter parameter models 344 previously generated using machine learning methodologies. In some examples, an ML filter parameter model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies used to generate an ML filter parameter model may include, but are not limited to, supervised learning, unsupervised learning, semi-supervised learning, reinforcement learning, dimensionality reduction, self-learning, feature learning, sparse dictionary learning, and anomaly detection.

In operation 310, the skeletal 3D model filtering component 360, as shown in FIG. 3C, receives the skeletal 3D model data 338 and skeletal 3D model filter parameter data 364 and uses a temporal filter to generate filtered skeletal 3D model data 362 based on the skeletal 3D model data 338 in accordance with the skeletal 3D model filter parameter data 364. For example, the skeletal 3D model data 338 includes a temporal sequence of skeletal 3D models, such as skeletal 3D model 366 and skeletal 3D model 370, comprising skeletal 3D model features, such as skeletal 3D model feature 368, skeletal 3D model feature 368, and skeletal 3D model feature 372. Each skeletal 3D model feature includes skeletal 3D model feature 3D coordinate data defining a location of the skeletal 3D model feature in a 3D coordinate system. For each skeletal 3D model feature Xn input to the skeletal 3D model filtering component 360 where n represents a position of the input skeletal 3D model feature in a temporal sequence of corresponding skeletal 3D model features, a temporal filter of the skeletal 3D model filtering component 360 generates a filtered skeletal 3D model feature, X'n, in the filtered targeting data 346.

In some examples, the temporal filter has various adjustable dynamic filter parameters included in the targeting filter parameter data 350 such as, but not limited to, a number of previous skeletal 3D model features used for averaging, a weighting applied to the current or previous skeletal 3D model feature of the sequence of skeletal 3D model features, and the like. A degree of filtering, that is how strongly or weakly the time sequence of skeletal 3D model features is smoothed or filtered by the temporal filter, is adjusted by setting the targeting filter parameter data 350.

In some examples, a temporal filter of the skeletal 3D model filtering component 360 averages the skeletal 3D model feature 3D coordinate data of the skeletal 3D model feature with the skeletal 3D model feature 3D coordinate data of a previously input skeletal 3D model feature to generate a filtered skeletal 3D model feature, X'n, in the filtered targeting data 346, where X'n=(Xn+Xn−1)/2. To increase the degree of smoothing or filtering, a previous two skeletal 3D model features of a sequence of skeletal 3D model features are used for averaging. To decrease an amount of smoothing or filtering, current target 3D coordinate data of a current skeletal 3D model feature value can be weighted to favor the current skeletal 3D model feature by a factor greater than a factor applied to one or more of previous skeletal 3D model features in a sequence of skeletal 3D model features.

In some examples, a temporal filter of a skeletal 3D model filtering component 360 comprises a low pass filter. In some examples, a temporal filter of a skeletal 3D model filtering component 360 having adjustable parameters comprises a Kalman filter, a 1 Euro Filter, or the like.

In some examples, the dynamic filter parameter component 342 determines a degree of smoothing or filtering applied to the skeletal 3D model data 338 based on a probability of an onset of a specified gesture or hand pose. In some examples, a degree of the smoothing or filtering is proportional to a probability of an onset of a specified gesture or hand pose. For instances, the greater degree of smoothing or filtering applied to the skeletal 3D model data 338, the greater a probability of an onset of the specified gesture or hand pose, and a lesser degree of filtering or smoothing applied to the skeletal 3D model data 338 by the skeletal 3D model filtering component 360, the lesser a probability of an onset of the specified gesture or hand pose. In some examples, a degree of the smoothing or filtering is inversely proportional to the probability that the specified gesture or hand pose is about to occur. For instance, a lesser degree of smoothing or filtering that is applied to the skeletal 3D model data 338, the greater a probability of onset of the specified gesture or hand pose, and a greater degree of filtering or smoothing that is applied to the skeletal 3D model data 338 by the skeletal 3D model filtering component 360, the lesser a probability of onset of the specified gesture or hand pose.

In some examples, a probability of an onset of a pinch gesture or hand pose is determined by the dynamic filter parameter component 342 based on a relative velocity of a (first) skeletal 3D model feature 372 corresponding to an index finger distal phalanx 374 (as shown in FIG. 3A) of the user 332, moving toward a (second) skeletal 3D model feature 368 corresponding to a thumb distal phalanx 376 of the user 332. The probability of the onset of the pinch gesture or hand pose is proportional to the relative velocity, that is, the greater the relative velocity, the greater the probability that onset of the gesture or hand pose is occurring.

In some examples, the skeletal 3D model filtering component 360 applies differential smoothing or filtering to specified skeletal 3D model features of a skeletal 3D model. For example, the skeletal 3D model filtering component 360 applies a greater degree of smoothing or filtering to a (first) skeletal 3D model feature 384 corresponding to a knuckle joint 386 than the skeletal 3D model filtering component 360 applies to a (second) skeletal 3D model feature 372 corresponding to an index finger distal phalanx 374.

In operation 312, a targeting component 354 receives the filtered skeletal 3D model data 362 and determines a target virtual 3D object or an apparent target location in the AR user interface 318 provided by the AR application 328 based on the filtered skeletal 3D model data 362 and an AR user interface model 358 generated by the AR application 328. For example, the AR application 328 generates one or more virtual 3D objects, such as virtual 3D object 320, that are included in the AR user interface model 358. The one or more virtual 3D objects comprise interactive components of the AR user interface 318 provided to the user 332 by the AR application 328. The one or more virtual 3D objects are rendered in 3D and displayed to the user 332 as part of an AR overlay using a display device of a head-wearable apparatus 100 of FIG. 1A and FIG. 1B. The user 332 interacts with the one or more virtual 3D objects using gestures and hand poses 334 to select and manipulate the virtual 3D objects. The one or more virtual 3D objects are represented in the AR user interface model 358 using 3D coordinates in a 3D coordinate system of the AR user interface model 358. In a similar manner, the filtered skeletal 3D model data 362 includes a temporal sequence of skeletal 3D models comprising skeletal 3D model features where each skeletal 3D model feature has a set of 3D coordinates in a common 3D coordinate system of the AR user interface model 358.

In some examples, a target virtual 3D object of a gesture being made by the user 332 is determined based on a distance between one or more specified nodes of the skeletal 3D model and a virtual 3D object. For example, a specified node of the skeletal 3D model may be a skeletal 3D model feature, such as skeletal 3D model feature 372, corresponding an index finger distal phalanx 374 of the user 332. The targeting component 354 calculates a 3D Euclidean distance between the specified skeletal 3D model feature and each virtual 3D object in the AR user interface model 358. The targeting component 354 determines a virtual 3D object having a shortest distance to the specified skeletal 3D model feature as a target virtual 3D object.

In some examples, in a methodology termed "raycasting", a virtual ray 382 is projected outward from a skeletal 3D model feature 378 of the skeletal 3D model 366 and a virtual 3D object 320 is determined as a target virtual 3D object based on intersection 380 between the virtual 3D object 320 and the virtual ray 382. In some examples, the skeletal 3D model feature 378 corresponds to a palm of a hand of the user 332. In some examples, the skeletal 3D model feature 378 represents a center of a hand of the user.

In some examples, a target virtual 3D object is determined on the basis of generating a virtual line segment between a (first) skeletal 3D model feature 372 corresponding to an index finger distal phalanx 374 of the user 332 and a (second) skeletal 3D model feature 368 corresponding to a thumb distal phalanx 376 of the user 332. The target virtual 3D object is determined based on an intersection between the virtual line segment and a virtual 3D object of the one or more virtual 3D objects.

In some examples, a target virtual 3D object is determined based on an end point of a pinching gesture being made by the user 332 where the endpoint is determined when a virtual 3D object 320, a (first) skeletal 3D model feature 372 corresponding to an index finger distal phalanx 374 of the user 332, and a (second) skeletal 3D model feature 368 corresponding to a thumb distal phalanx 376 of the user 332 coincide.

In some examples, an apparent target location is determined on the basis of generating a virtual line segment between a (first) skeletal 3D model feature 372 corresponding to an index finger distal phalanx 374 of the user 332 and a (second) skeletal 3D model feature 368 corresponding to a thumb distal phalanx 376 of the user 332. The apparent target location is determined based on a midpoint of the virtual line segment.

In some examples, an apparent target location is determined based on an end point of a pinching gesture being made by the user 332 where the endpoint is determined when a (first) skeletal 3D model feature 372 corresponding to an index finger distal phalanx 374 of the user 332 and a (second) skeletal 3D model feature 368 corresponding to a thumb distal phalanx 376 of the user 332 coincide.

In some examples, the targeting data 356 includes 3D coordinate data of a target virtual 3D object or an apparent target location within the 3D coordinate system of the AR user interface model 358. In some examples, the targeting data 356 includes metadata of a target virtual 3D object such as an identifier or the like.

In some examples, the targeting component 354 applies a hysteresis function during determination of a target virtual 3D object of a gesture or hand pose based on a previous state of a target virtual 3D object determination. For example, in a methodology where the targeting component 354 determines a target virtual 3D object based on a distance between a specified skeletal 3D model feature of a skeletal 3D model and virtual 3D object where the the closest virtual 3D object to the specified skeletal 3D model feature is determined as a target virtual 3D object, an advantage or bonus is applied to a currently determined target virtual 3D object by reducing a calculated distance between the specified skeletal 3D model feature and the currently selected target virtual 3D object. In some examples, the calculated distance is reduced by a fixed amount in a unit of distance of the AR user interface model 358. In some examples, the calculated distance is reduced by a factor, such as a percentage or ratio.

In some examples, the targeting component 354 receives skeletal 3D model data 338 that has not been filtered by the skeletal 3D model filtering component 360 and generates the targeting data 356 based on the unfiltered skeletal 3D model data 338.

In operation 314, the targeting filter component 340 receives the targeting data 356 and targeting filter parameter data 350 and uses a temporal filter to generate filtered targeting data 346 based on the targeting data 356 in accordance with the targeting filter parameter data 350 of the temporal filter. In some examples, the targeting data 356 includes a temporal sequence of target 3D coordinate data for target locations and target virtual 3D objects, collectively termed targets, as determined by the targeting component 354. For each specified target, An, input to the targeting filter component 340 where n represents a position of the input target in a temporal sequence of the targets, a temporal filter generates target 3D coordinate data of the target with target 3D coordinate data of a previously input target to generate an output target, A'n in the filtered targeting data 346. The temporal filter has various adjustable dynamic filter parameters included in the targeting filter parameter data 350. A degree of filtering, that is how strongly or weakly the time sequence of nodes is smoothed or filtered by the temporal filter, is adjusted by setting the targeting filter parameter data 350.

In some examples, a temporal filter averages target 3D coordinate data of a target with target 3D coordinate data of a previously input target to generate an output target, or A'n=(An+An−1)/2. The temporal filter has various adjustable dynamic filter parameters included in the targeting filter parameter data 350 such as, but not limited to, a number of previous targets used for averaging, a weighting applied to the current or previous targets, and the like. For example, to increase the degree of smoothing or filtering, a previous two targets of a sequence of targets are used for averaging. To decrease an amount of smoothing or filtering, current target 3D coordinate data of a current target can be weighted to favor the current target by a factor greater than a factor applied to one or more of previous targets in a sequence of targets.

In some examples, a temporal filter of a targeting filter component 340 comprises a low pass filter. In some examples, a temporal filter of a targeting filter component 340 having adjustable parameters comprises a Kalman filter, a 1 Euro Filter, or the like.

In some examples, a degree of smoothing or filtering applied by the targeting filter component 340 to targeting data 356 is determined by the dynamic filter parameter component 342 based on a probability of an onset of a specified gesture or hand pose. In some examples, a degree of the smoothing or filtering is proportional to a probability of an onset of a specified gesture or hand pose. For instance, a greater degree of smoothing or filtering that is applied to the targeting data 356, the greater a probability of an onset of the specified gesture or hand pose, and a lesser degree of filtering or smoothing that is applied to the targeting data 356 by the targeting filter component 340, the lesser a probability of an onset of the specified gesture or hand pose. In some examples, a degree of the smoothing or filtering is inversely proportional to the probability that the specified gesture or hand pose is about to occur. For instance, a lesser degree of smoothing or filtering that is applied to the targeting data 356, the greater a probability of onset of the specified gesture or hand pose, and a greater degree of filtering or smoothing that is applied to the targeting data 356 by the targeting filter component 340 the lesser a probability of onset of the specified gesture or hand pose.

In operation 316, the hand-tracking pipeline provides the filtered targeting data 346 to the AR application 328. The AR application 328 receives the filtered targeting data 346 and uses the filtered targeting data 346 as user input for additional operations of the AR application.

Networked Computing Environment

Figure 4:
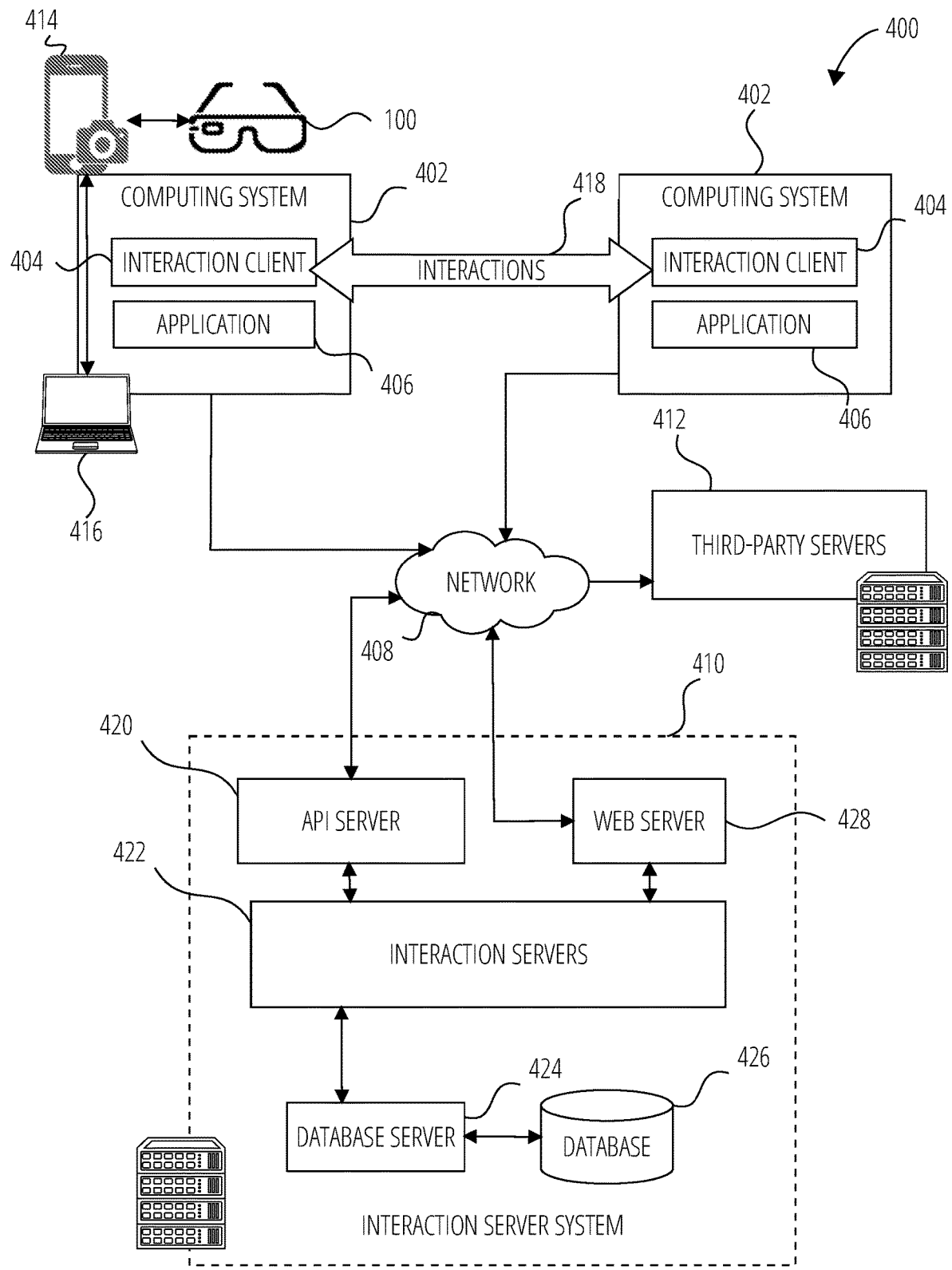
FIG. 4 is a diagrammatic representation of a networked environment in which the present disclosure may be deployed, according to some examples.

FIG. 4 is a block diagram showing an example interaction system 400 for facilitating interactions (e.g., exchanging text messages, conducting text audio and video calls, or playing games) over a network. The interaction system 400 includes multiple AR systems 402, each of which hosts multiple applications, including an interaction client 404 and other applications 406. Each interaction client 404 is communicatively coupled, via one or more communication networks including a network 408 (e.g., the Internet), to other instances of the interaction client 404 (e.g., hosted on respective other AR systems 402), an interaction server system 410 and third-party servers 412). An interaction client 404 can also communicate with locally hosted applications 406 using Applications Program Interfaces (APIs).

Each computing system 402 may comprise one or more user devices, such as a mobile device 414, head-wearable apparatus 100, and a computer client device 416 that are communicatively connected to exchange data and messages.

An interaction client 404 interacts with other interaction clients 404 and with the interaction server system 410 via the network 408. The data exchanged between the interaction clients 404 (e.g., interactions 418) and between the interaction clients 404 and the interaction server system 410 includes functions (e.g., commands to invoke functions) and payload data (e.g., text, audio, video, or other multimedia data).

The interaction server system 410 provides server-side functionality via the network 408 to the interaction clients 404. While certain functions of the interaction system 400 are described herein as being performed by either an interaction client 404 or by the interaction server system 410, the location of certain functionality either within the interaction client 404 or the interaction server system 410 may be a design choice. For example, it may be technically preferable to initially deploy particular technology and functionality within the interaction server system 410 but to later migrate this technology and functionality to the interaction client 404 where a computing system 402 has sufficient processing capacity.

The interaction server system 410 supports various services and operations that are provided to the interaction clients 404. Such operations include transmitting data to, receiving data from, and processing data generated by the interaction clients 404. This data may include message content, client device information, geolocation information, media augmentation and overlays, message content persistence conditions, social network information, and live event information. Data exchanges within the interaction system 400 are invoked and controlled through functions available via user interfaces (UIs) of the interaction clients 404.

Turning now specifically to the interaction server system 410, an Application Program Interface (API) server 420 is coupled to and provides programmatic interfaces to Interaction servers 422, making the functions of the Interaction servers 422 accessible to interaction clients 404, other applications 406 and third-party server 412. The Interaction servers 422 are communicatively coupled to a database server 424, facilitating access to a database 426 that stores data associated with interactions processed by the Interaction servers 422. Similarly, a web server 428 is coupled to the Interaction servers 422 and provides web-based interfaces to the Interaction servers 422. To this end, the web server 428 processes incoming network requests over the Hypertext Transfer Protocol (HTTP) and several other related protocols.

The Application Program Interface (API) server 420 receives and transmits interaction data (e.g., commands and message payloads) between the Interaction servers 422 and the AR systems 402 (and, for example, interaction clients 404 and other application 406) and the third-party server 412. Specifically, the Application Program Interface (API) server 420 provides a set of interfaces (e.g., routines and protocols) that can be called or queried by the interaction client 404 and other applications 406 to invoke functionality of the Interaction servers 422. The Application Program Interface (API) server 420 exposes various functions supported by the Interaction servers 422, including account registration; login functionality; the sending of interaction data, via the Interaction servers 422, from a particular interaction client 404 to another interaction client 404; the communication of media files (e.g., images or video) from an interaction client 404 to the Interaction servers 422; the settings of a collection of media data (e.g., a story); the retrieval of a list of friends of a user of a computing system 402; the retrieval of messages and content; the addition and deletion of entities (e.g., friends) to an entity graph (e.g., a social graph); the location of friends within a social graph; and opening an application event (e.g., relating to the interaction client 404).

The interaction servers 422 host multiple systems and subsystems, described below with reference to FIG. 7.

Linked Applications

Returning to the interaction client 404, features and functions of an external resource (e.g., a linked application 406 or applet) are made available to a user via an interface of the interaction client 404. In this context, "external" refers to the fact that the application 406 or applet is external to the interaction client 404. The external resource is often provided by a third party but may also be provided by the creator or provider of the interaction client 404. The interaction client 404 receives a user selection of an option to launch or access features of such an external resource. The external resource may be the application 406 installed on the computing system 402 (e.g., a "native app"), or a small-scale version of the application (e.g., an "applet") that is hosted on the computing system 402 or remote of the computing system 402 (e.g., on third-party servers 412). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 404. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 404 determines whether the selected external resource is a web-based external resource or a locally-installed application 406. In some cases, applications 406 that are locally installed on the computing system 402 can be launched independently of and separately from the interaction client 404, such as by selecting an icon corresponding to the application 406 on a home screen of the computing system 402. Small-scale versions of such applications can be launched or accessed via the interaction client 404 and, in some examples, no or limited portions of the small-scale application can be accessed outside of the interaction client 404. The small-scale application can be launched by the interaction client 404 receiving, from a third-party server 412 for example, a markup-language document associated with the small-scale application and processing such a document.

In response to determining that the external resource is a locally-installed application 406, the interaction client 404 instructs the computing system 402 to launch the external resource by executing locally-stored code corresponding to the external resource. In response to determining that the external resource is a web-based resource, the interaction client 404 communicates with the third-party servers 412 (for example) to obtain a markup-language document corresponding to the selected external resource. The interaction client 404 then processes the obtained markup-language document to present the web-based external resource within a user interface of the interaction client 404.

The interaction client 404 can notify a user of the computing system 402, or other users related to such a user (e.g., "friends"), of activity taking place in one or more external resources. For example, the interaction client 404 can provide participants in a conversation (e.g., a chat session) in the interaction client 404 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 404, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 404. The external resource can selectively include different media items in the responses, based on a current context of the external resource.

The interaction client 404 can present a list of the available external resources (e.g., applications 406 or applets) to a user to launch or access a given external resource. This list can be presented in a context-sensitive menu. For example, the icons representing different ones of the application 406 (or applets) can vary based on how the menu is launched by the user (e.g., from a conversation interface or from a non-conversation interface).

System with Head-Wearable Apparatus

Figure 5:
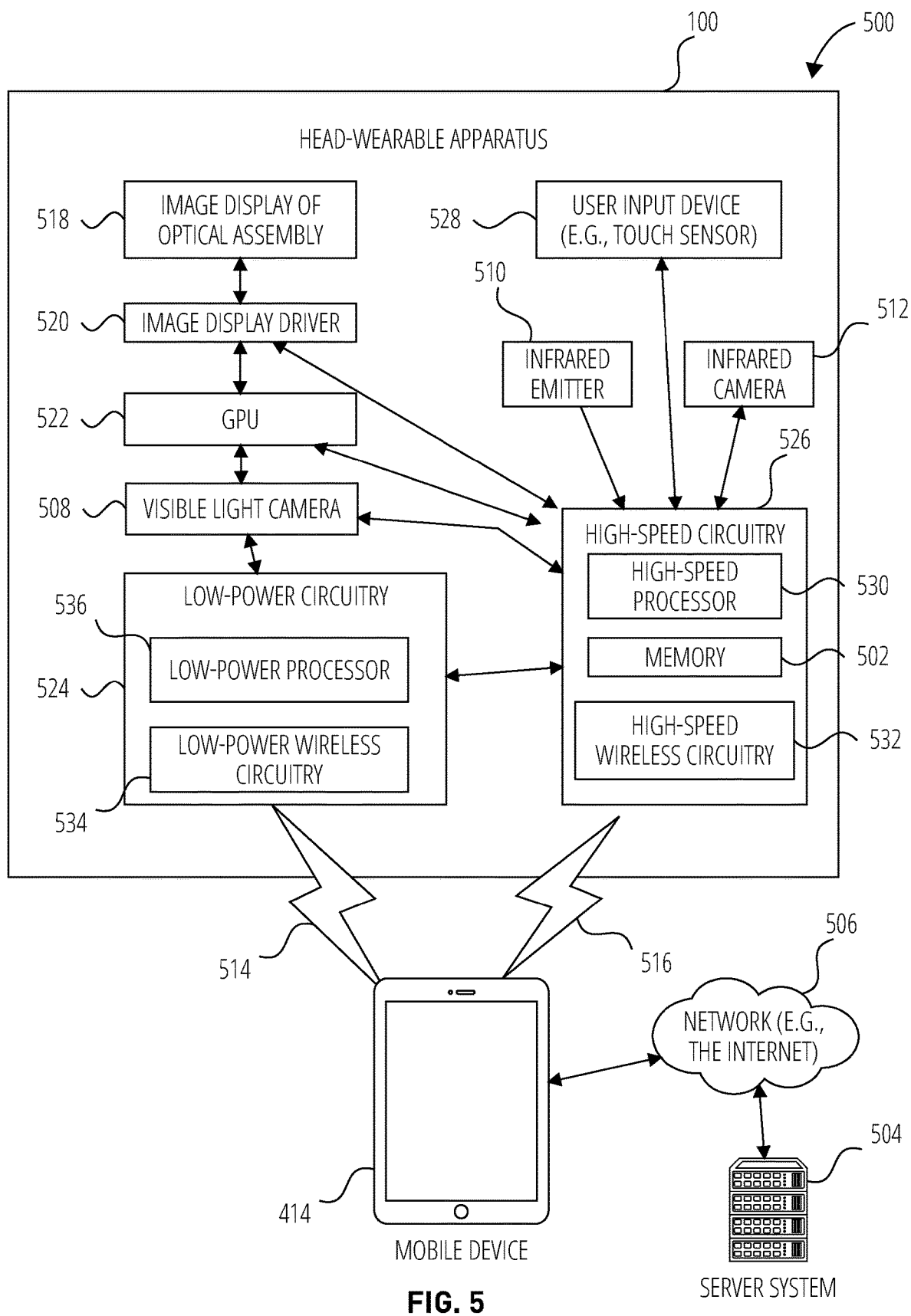
FIG. 5 illustrates a system of a head-wearable apparatus, according to some examples.

FIG. 5 illustrates a system 500 including a head-wearable apparatus 100 with a selector input device, according to some examples. FIG. 5 is a high-level functional block diagram of an example head-wearable apparatus 100 communicatively coupled to a mobile device 414 and various server systems 504 (e.g., the interaction server system 410) via various networks 408.

The head-wearable apparatus 100 includes one or more cameras, each of which may be, for example, a visible light camera 508, an infrared emitter 510, and an infrared camera 512.

The mobile device 414 connects with head-wearable apparatus 100 using both a low-power wireless connection 514 and a high-speed wireless connection 516. The mobile device 414 is also connected to the server system 504 and the network 506.

The head-wearable apparatus 100 further includes two image displays of the image display of optical assembly 518. The two image displays of optical assembly 518 include one associated with the left lateral side and one associated with the right lateral side of the head-wearable apparatus 100. The head-wearable apparatus 100 also includes an image display driver 520, and a GPU 522. The image display of optical assembly 518, image display driver 520, and GPU 522 constitute an optical engine of the head-wearable apparatus 100, low-power circuitry 524, and high-speed circuitry 526. The image display of optical assembly 518 is for presenting images and videos, including an image that can include a graphical user interface to a user of the head-wearable apparatus 100.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 528 (e.g., touch sensor or push button), including an input surface on the head-wearable apparatus 100. The user input device 528 (e.g., touch sensor or push button) is to receive from the user an input selection to manipulate the graphical user interface of the presented image.

The components shown in FIG. 5 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right visible light cameras 508 can include digital camera elements such as a complementary metal oxide—semiconductor (CMOS) image sensor, charge-coupled device, camera lenses, or any other respective visible or light-capturing elements that may be used to capture data, including images of scenes with unknown objects.

The head-wearable apparatus 100 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 100. The high-speed processor 530 includes processing resources needed for managing high-speed data transfers on a high-speed wireless connection 516 to a wireless local area network (WLAN) using the high-speed wireless circuitry 532. In certain examples, the high-speed processor 530 executes an operating system such as a LINUX operating system or other such operating system of the head-wearable apparatus 100, and the operating system is stored in the memory 502 for execution. In addition to any other responsibilities, the high-speed processor 530 executing a software architecture for the head-wearable apparatus 100 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WiFi. In some examples, other high-speed communications standards may be implemented by the high-speed wireless circuitry 532.

The low-power wireless circuitry 534 and the high-speed wireless circuitry 532 of the head-wearable apparatus 100 can include short-range transceivers (Bluetooth™) and wireless wide, local, or wide area network transceivers (e.g., cellular or WiFi). Mobile device 414, including the transceivers communicating via the low-power wireless connection 514 and the high-speed wireless connection 516, may be implemented using details of the architecture of the head-wearable apparatus 100, as can other elements of the network 506.

The memory 502 includes any storage device capable of storing various data and applications, including, among other things, camera data generated by the left and right visible light cameras 508, the infrared camera 512, and the GPU 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 100. In certain such examples, electrical routing lines may provide a connection through a chip that includes the high-speed processor 530 from the GPU 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 100 can be coupled to the camera (visible light camera 508, infrared emitter 510, or infrared camera 512), the image display driver 520, the user input device 528 (e.g., touch sensor or push button), and the memory 502.

The head-wearable apparatus 100 is connected to a host computer. For example, the head-wearable apparatus 100 is paired with the mobile device 414 via the high-speed wireless connection 516 or connected to the server system 504 via the network 506. The server system 504 may be one or more computing devices as part of a service or network computing system, for example, that includes a processor, a memory, and network communication interface to communicate over the network 506 with the mobile device 414 and the head-wearable apparatus 100.

The mobile device 414 includes a processor and a network communication interface coupled to the processor. The network communication interface allows for communication over the network 506, low-power wireless connection 514, or high-speed wireless connection 516. Mobile device 414 can further store at least portions of the instructions for generating binaural audio content in the mobile device 414's memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 100 further include acoustic components (e.g., speakers), haptic components (e.g., a vibratory motor), other signal generators, and so forth. The input components of the head-wearable apparatus 100, the mobile device 414, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 may also include additional peripheral device elements. Such peripheral device elements may include biometric sensors, additional sensors, or display elements integrated with the head-wearable apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that Detect Air Pressure from which Altitude May be Derived), Orientation Sensor Components (e.g., magnetometers), and the like. Such positioning system coordinates can also be received over low-power wireless connections 514 and high-speed wireless connection 516 from the mobile device 414 via the low-power wireless circuitry 534 or high-speed wireless circuitry 532.

Data Architecture

Figure 6:
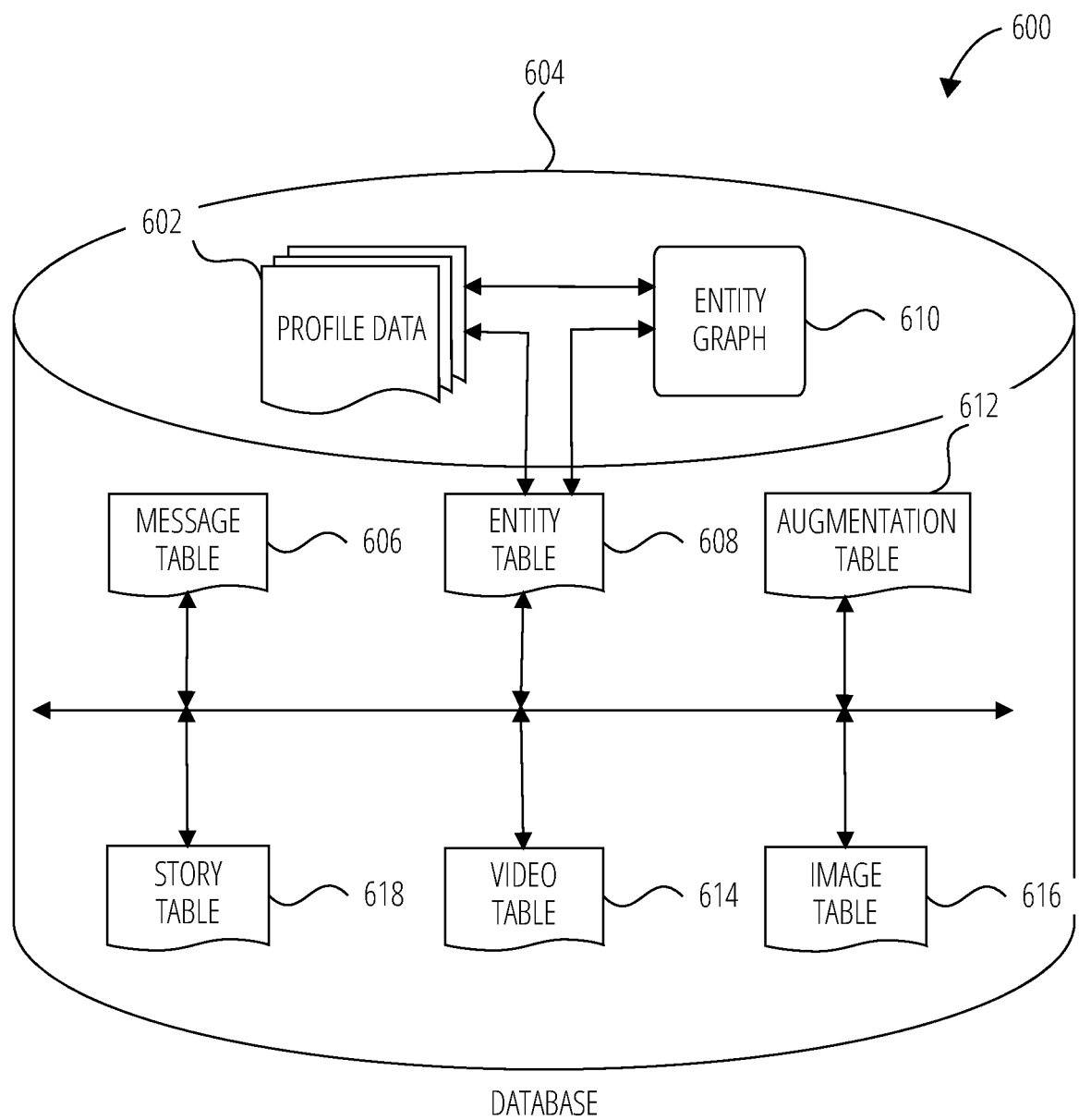
FIG. 6 is a diagrammatic representation of a data structure as maintained in a database, according to some examples.

FIG. 6 is a schematic diagram illustrating data structures 600, which may be stored in the database 604 of the interaction server system 410, according to certain examples. While the content of the database 604 is shown to comprise multiple tables, it will be appreciated that the data could be stored in other types of data structures (e.g., as an object-oriented database).

The database 604 includes message data stored within a message table 606. This message data includes, for any particular message, at least message sender data, message recipient (or receiver) data, and a payload. Further details regarding information that may be included in a message, and included within the message data stored in the message table 606, are described below with reference to FIG. 6.

An entity table 608 stores entity data, and is linked (e.g., referentially) to an entity graph 610 and profile data 602. Entities for which records are maintained within the entity table 608 may include individuals, corporate entities, organizations, objects, places, events, and so forth. Regardless of entity type, any entity regarding which the interaction server system 410 stores data may be a recognized entity. Each entity is provided with a unique identifier, as well as an entity type identifier (not shown).

The entity graph 610 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 400.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 608. Such privacy settings may be applied to all types of relationships within the context of the interaction system 400, or may selectively be applied to only certain types of relationships.

The profile data 602 stores multiple types of profile data about a particular entity. The profile data 602 may be selectively used and presented to other users of the interaction system 400 based on privacy settings specified by a particular entity. Where the entity is an individual, the profile data 602 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 400, and on map interfaces displayed by interaction clients 404 to other users. The collection of avatar representations may include "status avatars," which present a graphical representation of a status or activity that the user may select to communicate at a particular time.

Where the entity is a group, the profile data 602 for the group may similarly include one or more avatar representations associated with the group, in addition to the group name, members, and various settings (e.g., notifications) for the relevant group.

The database 604 also stores augmentation data, such as overlays or filters, in an augmentation table 612. The augmentation data is associated with and applied to videos (for which data is stored in a video table 614) and images (for which data is stored in an image table 616).

Filters, in some examples, are overlays that are displayed as overlaid on an image or video during presentation to a message receiver. Filters may be of various types, including user-selected filters from a set of filters presented to a message sender by the interaction client 404 when the message sender is composing a message. Other types of filters include geolocation filters (also known as geo-filters), which may be presented to a message sender based on geographic location. For example, geolocation filters specific to a neighborhood or special location may be presented within a user interface by the interaction client 404, based on geolocation information determined by a Global Positioning System (GPS) unit of the computing system 402.

Another type of filter is a data filter, which may be selectively presented to a message sender by the interaction client 404 based on other inputs or information gathered by the computing system 402 during the message creation process. Examples of data filters include current temperature at a specific location, a current speed at which a message sender is traveling, battery life for a computing system 402, or the current time.

Other augmentation data that may be stored within the image table 616 includes augmented reality content items (e.g., corresponding to applying Lenses or augmented reality experiences). An augmented reality content item may be a real-time special effect and sound that may be added to an image or a video.

As described above, augmentation data includes AR, VR, and mixed reality (MR) content items, overlays, image transformations, images, and modifications that may be applied to image data (e.g., videos or images). This includes real-time modifications, which modify an image as it is captured using device sensors (e.g., one or multiple cameras) of the computing system 402 and then displayed on a screen of the computing system 402 with the modifications. This also includes modifications to stored content, such as video clips in a collection or group that may be modified. For example, in a computing system 402 with access to multiple augmented reality content items, a user can use a single video clip with multiple augmented reality content items to see how the different augmented reality content items will modify the stored clip. Similarly, real-time video capture may use modifications to show how video images currently being captured by sensors of a computing system 402 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, visual features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the computing system 402) and perform complex image manipulations locally on the computing system 402 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the computing system 402.

In some examples, a computer animation model to transform image data can be used by a system where a user may capture an image or video stream of the user (e.g., a selfie) using the computing system 402 having a neural network operating as part of an interaction client 404 operating on the computing system 402. The transformation system operating within the interaction client 404 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the computing system 402 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 618 stores data regarding collections of messages and associated image, video, or audio data, which are compiled into a collection (e.g., a story or a gallery). The creation of a particular collection may be initiated by a particular user (e.g., each user for which a record is maintained in the entity table 608). A user may create a "personal story" in the form of a collection of content that has been created and sent/broadcast by that user. To this end, the user interface of the interaction client 404 may include an icon that is user-selectable to enable a message sender to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 404, to contribute content to a particular live story. The live story may be identified to the user by the interaction client 404, based on his or her location. The end result is a "live story" told from a community perspective.

A further type of content collection is known as a "location story," which enables a user whose computing system 402 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 614 stores video data that, in some examples, is associated with messages for which records are maintained within the message table 606. Similarly, the image table 616 stores image data associated with messages for which message data is stored in the entity table 608. The entity table 608 may associate various augmentations from the augmentation table 612 with various images and videos stored in the image table 616 and the video table 614.

The databases 604 also includes social network information collected by the social network system 722.

System Architecture

Figure 7:
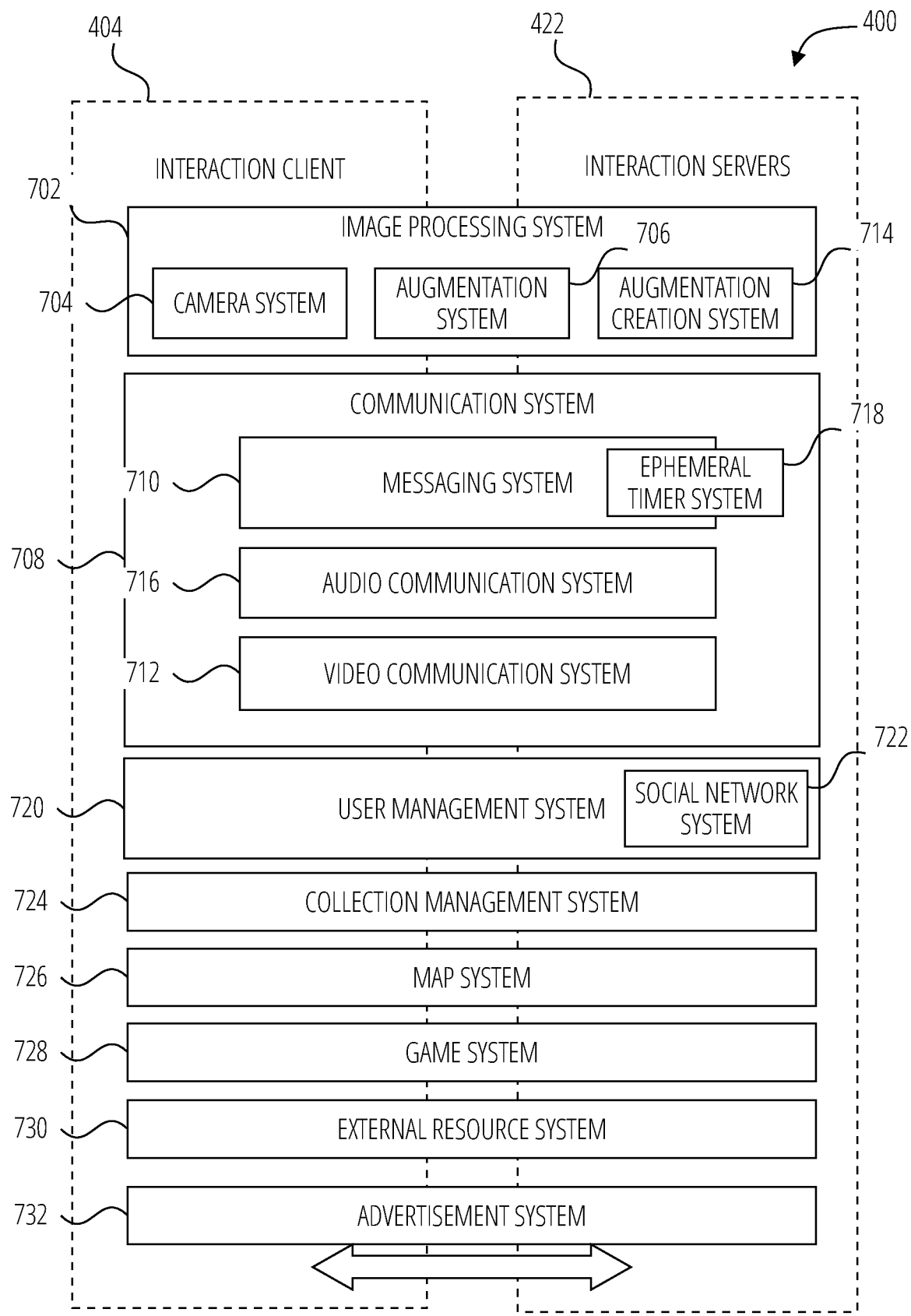
FIG. 7 is a diagrammatic representation of a messaging system, according to some examples, that has both client-side and server-side functionality.

FIG. 7 is a block diagram illustrating further details regarding the interaction system 400, according to some examples. Specifically, the interaction system 400 is shown to comprise the interaction client 404 and the Interaction servers 422. The interaction system 400 embodies multiple subsystems, which are supported on the client-side by the interaction client 404 and on the server-side by the Interaction servers 422. Example subsystems are discussed below.

An image processing system 702 provides various functions that enable a user to capture and augment (e.g., augment or otherwise modify or edit) media content associated with a message.

A camera system 704 includes control software (e.g., in a camera application) that interacts with and controls hardware camera hardware (e.g., directly or via operating system controls) of the computing system 402 to modify and augment real-time images captured and displayed via the interaction client 404.

The augmentation system 706 provides functions related to the generation and publishing of augmentations (e.g., media overlays) for images captured in real-time by cameras of the computing system 402 or retrieved from memory of the computing system 402. For example, the augmentation system 706 operatively selects, presents, and displays media overlays (e.g., an image filter or an image lens) to the interaction client 404 for the augmentation of real-time images received via the camera system 704 or stored images retrieved from memory 502 of a computing system 402. These augmentations are selected by the augmentation system 706 and presented to a user of an interaction client 404, based on a number of inputs and data, such as for example:

Geolocation of the computing system 402; and

Social network information of the user of the computing system 402.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at computing system 402 for communication in a message, or applied to video content, such as a video content stream or feed transmitted from an interaction client 404. As such, the image processing system 702 may interact with, and support, the various subsystems of the communication system 708, such as the messaging system 710 and the video communication system 712.

A media overlay may include text or image data that can be overlaid on top of a photograph taken by the computing system 402 or a video stream produced by the computing system 402. In some examples, the media overlay may be a location overlay (e.g., Venice beach), a name of a live event, or a name of a merchant overlay (e.g., Beach Coffee House). In further examples, the image processing system 702 uses the geolocation of the computing system 402 to identify a media overlay that includes the name of a merchant at the geolocation of the computing system 402. The media overlay may include other indicia associated with the merchant. The media overlays may be stored in the databases 426 and accessed through the database server 424.

The image processing system 702 provides a user-based publication platform that enables users to select a geolocation on a map and upload content associated with the selected geolocation. The user may also specify circumstances under which a particular media overlay should be offered to other users. The image processing system 702 generates a media overlay that includes the uploaded content and associates the uploaded content with the selected geolocation.

The augmentation creation system 714 supports augmented reality developer platforms and includes an application for content creators (e.g., artists and developers) to create and publish augmentations (e.g., augmented reality experiences) of the interaction client 404. The augmentation creation system 714 provides a library of built-in features and tools to content creators including, for example custom shaders, tracking technology, and templates.

In some examples, the augmentation creation system 714 provides a merchant-based publication platform that enables merchants to select a particular augmentation associated with a geolocation via a bidding process. For example, the augmentation creation system 714 associates a media overlay of the highest bidding merchant with a corresponding geolocation for a predefined amount of time.

A communication system 708 is responsible for enabling and processing multiple forms of communication and interaction within the interaction system 400 and includes a messaging system 710, an audio communication system 716, and a video communication system 712. The messaging system 710 is responsible for enforcing the temporary or time-limited access to content by the interaction clients 404. The messaging system 710 incorporates multiple timers (e.g., within an ephemeral timer system 718) that, based on duration and display parameters associated with a message or collection of messages (e.g., a story), selectively enable access (e.g., for presentation and display) to messages and associated content via the interaction client 404. Further details regarding the operation of the ephemeral timer system 718 are provided below. The audio communication system 716 enables and supports audio communications (e.g., real-time audio chat) between multiple interaction clients 404. Similarly, the video communication system 712 enables and supports video communications (e.g., real-time video chat) between multiple interaction clients 404.

A user management system 720 is operationally responsible for the management of user data and profiles, and includes a social network system 722 that maintains social network information regarding relationships between users of the interaction system 400.

A collection management system 724 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 724 may also be responsible for publishing an icon that provides notification of a particular collection to the user interface of the interaction client 404. The collection management system 724 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 724 employs machine vision (or image recognition technology) and content rules to curate a content collection automatically. In certain examples, compensation may be paid to a user to include user-generated content into a collection. In such cases, the collection management system 724 operates to automatically make payments to such users to use their content.

A map system 726 provides various geographic location functions and supports the presentation of map-based media content and messages by the interaction client 404. For example, the map system 726 enables the display of user icons or avatars (e.g., stored in profile data 602) on a map to indicate a current or past location of "friends" of a user, as well as media content (e.g., collections of messages including photographs and videos) generated by such friends, within the context of a map. For example, a message posted by a user to the interaction system 400 from a specific geographic location may be displayed within the context of a map at that particular location to "friends" of a specific user on a map interface of the interaction client 404. A user can furthermore share his or her location and status information (e.g., using an appropriate status avatar) with other users of the interaction system 400 via the interaction client 404, with this location and status information being similarly displayed within the context of a map interface of the interaction client 404 to selected users.

A game system 728 provides various gaming functions within the context of the interaction client 404. The interaction client 404 provides a game interface providing a list of available games that can be launched by a user within the context of the interaction client 404 and played with other users of the interaction system 400. The interaction system 400 further enables a particular user to invite other users to participate in the play of a specific game by issuing invitations to such other users from the interaction client 404. The interaction client 404 also supports audio, video, and text messaging (e.g., chats) within the context of gameplay, provides a leaderboard for the games, and also supports the provision of in-game rewards (e.g., coins and items).

An external resource system 730 provides an interface for the interaction client 404 to communicate with remote servers (e.g., third-party servers 412) to launch or access external resources, i.e., applications or applets. Each third-party server 412 hosts, for example, a markup language (e.g., HTML5) based application or a small-scale version of an application (e.g., game, utility, payment, or ride-sharing application). The interaction client 404 may launch a web-based resource (e.g., application) by accessing the HTML5 file from the third-party servers 412 associated with the web-based resource. Applications hosted by third-party servers 412 are programmed in JavaScript leveraging a Software Development Kit (SDK) provided by the Interaction servers 422. The SDK includes Application Programming Interfaces (APIs) with functions that can be called or invoked by the web-based application. The Interaction servers 422 host a JavaScript library that provides a given external resource access to specific user data of the interaction client 404. HTML5 is an example of technology for programming games, but applications and resources programmed based on other technologies can be used.

To integrate the functions of the SDK into the web-based resource, the SDK is downloaded by the third-party server 412 from the Interaction servers 422 or is otherwise received by the third-party server 412. Once downloaded or received, the SDK is included as part of the application code of a web-based external resource. The code of the web-based resource can then call or invoke certain functions of the SDK to integrate features of the interaction client 404 into the web-based resource.

The SDK stored on the interaction server system 410 effectively provides the bridge between an external resource (e.g., applications 406 or applets) and the interaction client 404. This gives the user a seamless experience of communicating with other users on the interaction client 404 while also preserving the look and feel of the interaction client 404. To bridge communications between an external resource and an interaction client 404, the SDK facilitates communication between third-party servers 412 and the interaction client 404. A WebViewJavaScriptBridge running on a computing system 402 establishes two one-way communication channels between an external resource and the interaction client 404. Messages are sent between the external resource and the interaction client 404 via these communication channels asynchronously. Each SDK function invocation is sent as a message and callback. Each SDK function is implemented by constructing a unique callback identifier and sending a message with that callback identifier.

By using the SDK, not all information from the interaction client 404 is shared with third-party servers 412. The SDK limits which information is shared based on the needs of the external resource. Each third-party server 412 provides an HTML5 file corresponding to the web-based external resource to Interaction servers 422. The Interaction servers 422 can add a visual representation (such as a box art or other graphic) of the web-based external resource in the interaction client 404. Once the user selects the visual representation or instructs the interaction client 404 through a GUI of the interaction client 404 to access features of the web-based external resource, the interaction client 404 obtains the HTML5 file and instantiates the resources to access the features of the web-based external resource.

The interaction client 404 presents a graphical user interface (e.g., a landing page or title screen) for an external resource. During, before, or after presenting the landing page or title screen, the interaction client 404 determines whether the launched external resource has been previously authorized to access user data of the interaction client 404. In response to determining that the launched external resource has been previously authorized to access user data of the interaction client 404, the interaction client 404 presents another graphical user interface of the external resource that includes functions and features of the external resource. In response to determining that the launched external resource has not been previously authorized to access user data of the interaction client 404, after a threshold period of time (e.g., 3 seconds) of displaying the landing page or title screen of the external resource, the interaction client 404 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 404 adds the external resource to a list of authorized external resources and allows the external resource to access user data from the interaction client 404. The external resource is authorized by the interaction client 404 to access the user data under an OAuth 2 framework.

The interaction client 404 controls the type of user data that is shared with external resources based on the type of external resource being authorized. For example, external resources that include full-scale applications (e.g., an application 406) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 732 operationally enables the purchasing of advertisements by third parties for presentation to end-users via the interaction clients 404 and also handles the delivery and presentation of these advertisements.

Software Architecture

Figure 8:
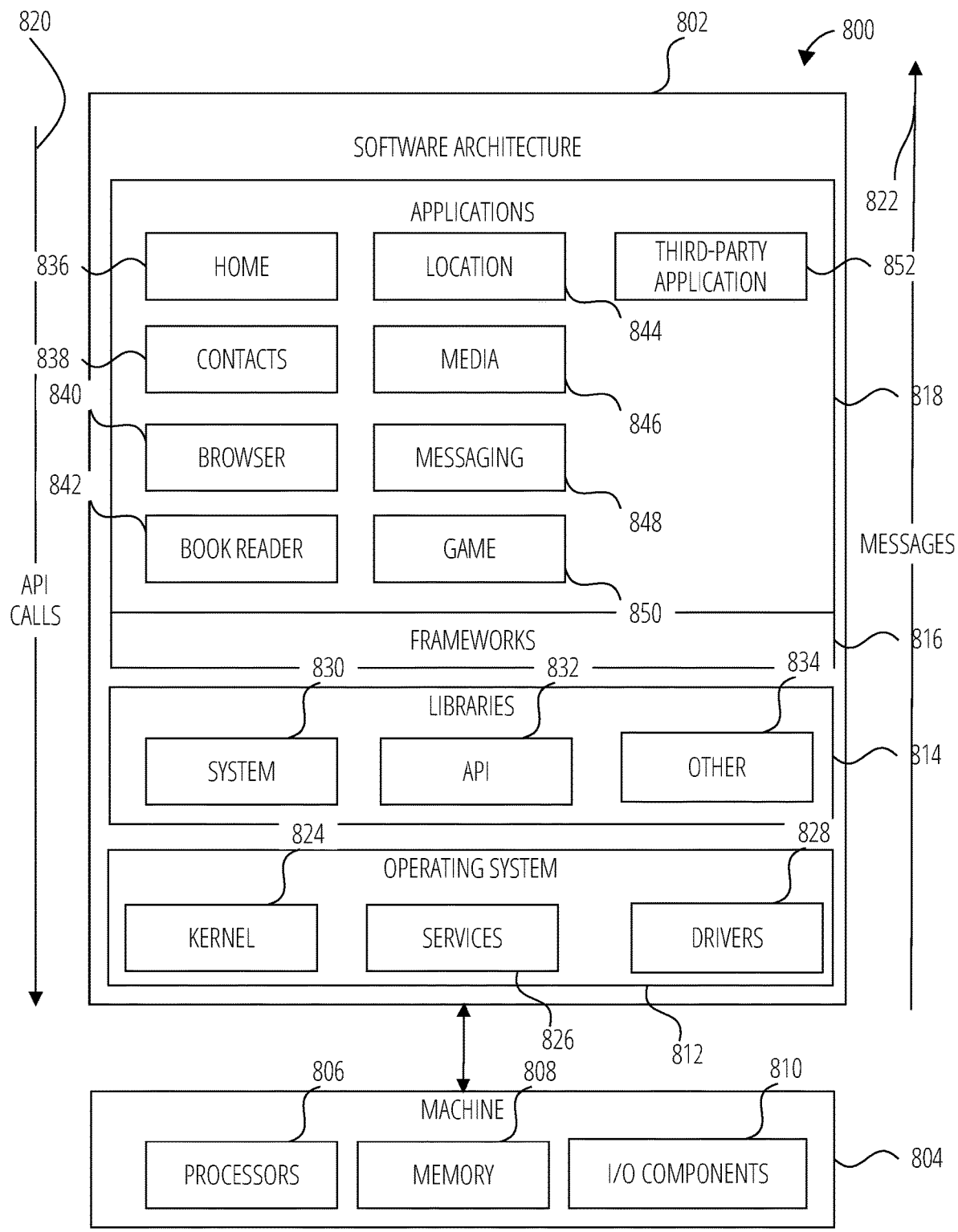
FIG. 8 is a block diagram showing a software architecture within which examples may be implemented.

FIG. 8 is a block diagram 800 illustrating a software architecture 802, which can be installed on any one or more of the devices described herein. The software architecture 802 is supported by hardware such as a machine 804 that includes processors 806, memory 808, and I/O components 810. In this example, the software architecture 802 can be conceptualized as a stack of layers, where each layer provides a particular functionality. The software architecture 802 includes layers such as an operating system 812, libraries 814, frameworks 816, and applications 818. Operationally, the applications 818 invoke API calls 820 through the software stack and receive messages 822 in response to the API calls 820.

The operating system 812 manages hardware resources and provides common services. The operating system 812 includes, for example, a kernel 824, services 826, and drivers 828. The kernel 824 acts as an abstraction layer between the hardware and the other software layers. For example, the kernel 824 provides memory management, processor management (e.g., scheduling), component management, networking, and security settings, among other functionalities. The services 826 can provide other common services for the other software layers. The drivers 828 are responsible for controlling or interfacing with the underlying hardware. For instance, the drivers 828 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 814 provide a common low-level infrastructure used by the applications 818. The libraries 814 can include system libraries 830 (e.g., C standard library) that provide functions such as memory allocation functions, string manipulation functions, mathematic functions, and the like. In addition, the libraries 814 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 814 can also include a wide variety of other libraries 834 to provide many other APIs to the applications 818.

The frameworks 816 provide a common high-level infrastructure that is used by the applications 818. For example, the frameworks 816 provide various graphical user interface (GUI) functions, high-level resource management, and high-level location services. The frameworks 816 can provide a broad spectrum of other APIs that can be used by the applications 818, some of which may be specific to a particular operating system or platform.

In an example, the applications 818 may include a home application 836, a contacts application 838, a browser application 840, a book reader application 842, a location application 844, a media application 846, a messaging application 848, a game application 850, and a broad assortment of other applications such as a third-party application 852. The applications 818 are programs that execute functions defined in the programs. Various programming languages can be employed to create one or more of the applications 818, structured in a variety of manners, such as object-oriented programming languages (e.g., Objective-C, Java, or C++) or procedural programming languages (e.g., C or assembly language). In a specific example, the third-party application 852 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 852 can invoke the API calls 820 provided by the operating system 812 to facilitate functionalities described herein.

CONCLUSION

Changes and modifications may be made to the disclosed examples without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A machine comprising:
one or more processors; and
a memory storing instructions that, when executed by the one or more processors, cause the machine to perform operations comprising:
providing, by an Augmented Reality (AR) application of an AR system, a user interface to a user of the AR system, the user interface including one or more virtual 3D objects selectable by a user of the AR system;
capturing, using one or more cameras of the AR system, video frame tracking data of a hand of a user while the user interacts with the user interface;
generating filter parameter data based on the video frame tracking data, the filter parameter data including a first degree of smoothing applied to skeletal 3D model data of a hand of the user and a second degree of smoothing applied to targeting data of the one or more virtual 3D objects, the first degree of smoothing and the second degree of smoothing dynamically adjusted in proportion to a probability of an onset of a gesture being made by the hand of the user;
generating the skeletal 3D model data of the hand of the user based on the video frame tracking data, the skeletal 3D model data including one or more skeletal 3D model features corresponding to recognized visual landmarks of portions of the hand of the user;
generating filtered skeletal 3D model data using the first degree of smoothing;
based on the filtered skeletal 3D model data, generating the targeting data identifying a target virtual 3D object of the one or more virtual 3D objects of the AR user interface, the targeting data including a temporal sequence of target 3D coordinate data for a target location of the target virtual 3D object;
generating filtered targeting data from the targeting data using a temporal filter and the second degree of smoothing; and
providing the filtered targeting data to the AR application as user input into the AR application.

2. The machine of claim 1, further comprising generating the filter parameter data using a Machine Learning (ML) model.

3. The machine of claim 1, wherein the targeting data is filtered using a low pass filter.

4. The machine of claim 1, wherein generating the filtered skeletal 3D model data includes applying differential smoothing to specified skeletal 3D model features of the 3D model data.

5. The machine of claim 1, wherein the probability of the onset of the gesture is determined based on a relative velocity of a first skeletal 3D model feature of the skeletal 3D model data moving toward a second skeletal 3D model feature of the skeletal 3D model data.

6. The machine of claim 1, wherein the skeletal 3D model data is filtered using a low pass filter.

7. The machine of claim 1, wherein the AR system comprises a head-wearable apparatus.

8. A computer-implemented method comprising:
providing, by one or more processors, a user interface of an AR application of an AR system, the user interface including one or more virtual 3D objects selectable by a user of the AR system;
capturing, by the one or more processors, using one or more cameras of the AR system, video frame tracking data of a hand of a user while the user interacts with the user interface;
generating, by the one or more processors, filter parameter data based on the video frame tracking data, the filter parameter data including a first degree of smoothing applied to skeletal 3D model data of a hand of the user and a second degree of smoothing applied to targeting data of the one or more virtual 3D objects, the first degree of smoothing and the second degree of smoothing dynamically adjusted in proportion to a probability of an onset of a gesture being made by the hand of the user;
generating, by the one or more processors, the skeletal 3D model data of the hand of the user based on the video frame tracking data, the skeletal 3D model data including one or more skeletal 3D model features corresponding to recognized visual landmarks of portions of the hand of the user;

generating, by the one or more processors, filtered skeletal 3D model data using the first degree of smoothing;

based on the filtered skeletal 3D model data, generating, by the one or more processors, targeting data identifying a target virtual 3D object of the one or more virtual 3D objects of the AR user interface, the targeting data including a temporal sequence of target 3D coordinate data for a target location of the target virtual 3D object;

generating, by the one or more processors, filtered targeting data from the targeting data using a temporal filter and the second degree of smoothing; and providing, by the one or more processors, the filtered targeting data to the AR application as user input into the AR application.

9. The computer-implemented method of claim 8, further comprising:

generating, by the one or more processors, the filter parameter data using a Machine Learning (ML) model.

10. The computer-implemented method of claim 8, wherein the targeting data is filtered using a low pass filter.

11. The computer-implemented method of claim 8, wherein generating the filtered skeletal 3D model data includes applying differential smoothing to specified skeletal 3D model features of the 3D model data.

12. The computer-implemented method of claim 8, wherein the probability of the onset of the gesture is determined based on a relative velocity of a first skeletal 3D model feature of the skeletal 3D model data moving toward a second skeletal 3D model feature of the skeletal 3D model data.

13. The computer-implemented method of claim 8, wherein the skeletal 3D model data is filtered using a low pass filter.

14. The computer-implemented method of claim 8, wherein the AR system comprises a head-wearable apparatus.

15. A non-transitory computer-readable storage medium, the computer-readable storage medium including instructions that when executed by a computer, cause the computer to perform operations comprising:

providing a user interface of an AR application of an AR system, the user interface including one or more virtual 3D objects selectable by a user of the AR system;

capturing, using one or more cameras of the AR system, video frame tracking data of a hand of a user while the user interacts with the user interface;

generating filter parameter data based on the video frame tracking data, the filter parameter data including a first degree of smoothing applied to skeletal 3D model data of a hand of the user and a second degree of smoothing applied to targeting data of the one or more virtual 3D objects, the first degree of smoothing and the second degree of smoothing dynamically adjusted in proportion to a probability of an onset of a gesture being made by the hand of the user;

generating the skeletal 3D model data of the hand of the user based on the video frame tracking data, the skeletal 3D model data including one or more skeletal 3D model features corresponding to recognized visual landmarks of portions of the hand of the user;

generating filtered skeletal 3D model data using the first degree of smoothing;

based on the filtered skeletal 3D model data, generating the targeting data identifying a target virtual 3D object of the one or more virtual 3D objects of the AR user interface, the targeting data including a temporal sequence of target 3D coordinate data for a target location of the target virtual 3D object;

generating filtered targeting data from the targeting data using a temporal filter and the second degree of smoothing; and providing the filtered targeting data to the AR application as user input into the AR application.

16. The computer-readable storage medium of claim 15, wherein the operations further comprise: generating the filter parameter data using a Machine Learning (ML) model.

17. The computer-readable storage medium of claim 15, wherein the targeting data is filtered using a low pass filter.

18. The computer-readable storage medium of claim 15, wherein generating the filtered skeletal 3D model data includes applying differential smoothing to specified skeletal 3D model features of the 3D model data.

19. The computer-readable storage medium of claim 15, wherein the probability of the onset of the gesture is determined based on a relative velocity of a first skeletal 3D model feature of the skeletal 3D model data moving toward a second skeletal 3D model feature of the skeletal 3D model data.

20. The computer-readable storage medium of claim 15, wherein the AR system comprises a head-wearable apparatus.

* * * * *